United States Patent
Jeon et al.

(10) Patent No.: US 11,544,006 B2
(45) Date of Patent: Jan. 3, 2023

(54) STORAGE DEVICE AND OPERATING METHOD THEREOF

(71) Applicant: Samsung Electronics Co., Ltd., Suwon-si (KR)

(72) Inventors: Dongik Jeon, Seoul (KR); Kyungbo Yang, Hwaseong-si (KR); Seokwon Ahn, Suwon-si (KR); Hyeonwu Kim, Chilgok-gun (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/032,654

(22) Filed: Sep. 25, 2020

(65) Prior Publication Data
US 2021/0263682 A1    Aug. 26, 2021

(30) Foreign Application Priority Data
Feb. 20, 2020    (KR) .................. 10-2020-0021033

(51) Int. Cl.
*G06F 3/06*    (2006.01)
(52) U.S. Cl.
CPC .......... *G06F 3/0659* (2013.01); *G06F 3/0604* (2013.01); *G06F 3/0679* (2013.01)
(58) Field of Classification Search
CPC .... G06F 3/0604; G06F 3/0608; G06F 3/0616; G06F 3/0631; G06F 3/0638; G06F 3/0644; G06F 3/0658; G06F 3/0659; G06F 3/0679; G06F 12/0246; G06F 2212/1044; G06F 2212/7201; G06F 2212/7202
See application file for complete search history.

(56) References Cited

U.S. PATENT DOCUMENTS

| | | | | |
|---|---|---|---|---|
| 5,488,433 | A | * | 1/1996 | Washino ............... H04N 5/222 348/E7.086 |
| 5,537,658 | A | * | 7/1996 | Bakke .................. G06F 3/0601 707/999.2 |
| 7,596,657 | B2 | | 9/2009 | Kaier |
| 8,706,953 | B2 | | 4/2014 | Cho et al. |

(Continued)

FOREIGN PATENT DOCUMENTS

| | | |
|---|---|---|
| CN | 105843753 A | 8/2016 |
| CN | 109542331 A | 3/2019 |

(Continued)

OTHER PUBLICATIONS

Matias Bjørling, 'From Open-Channel SSDs to Zoned Namespaces' Western Digital, 2019.

(Continued)

*Primary Examiner* — Larry T Mackall
(74) *Attorney, Agent, or Firm* — Harness, Dickey & Pierce, P.L.C.

(57) ABSTRACT

A storage device may include a non-volatile memory including a plurality of zones, the non-volatile memory configured to sequentially store data in at least one of the plurality of zones, and a processing circuitry configured to, receive a first write command and first data from a host, the first write command including a first logical address, identify a first zone of the plurality of zones based on the first logical address, compress the first data based on compression settings corresponding to the first zone, and write the compressed first data to the first zone.

14 Claims, 17 Drawing Sheets

(56) References Cited

U.S. PATENT DOCUMENTS

| | | |
|---|---|---|
| 8,880,836 B2 | 11/2014 | Owa et al. |
| 8,949,568 B2 | 2/2015 | Wei et al. |
| 8,954,693 B2 | 2/2015 | Seo et al. |
| 9,229,876 B2 | 1/2016 | Slepon |
| 9,418,699 B1 * | 8/2016 | Gibbons ............ G11B 20/1217 |
| 9,940,230 B2 | 4/2018 | Shah |
| 10,545,862 B2 | 1/2020 | Kanno et al. |
| 10,642,532 B2 * | 5/2020 | Baptist ................. G06F 3/0659 |
| 10,789,160 B2 | 9/2020 | Seo et al. |
| 2014/0281155 A1 * | 9/2014 | Cohen .................. G06F 3/0619 |
| | | 711/103 |
| 2015/0339319 A1 | 11/2015 | Malina |
| 2016/0371190 A1 | 12/2016 | Romanovskiy |
| 2017/0090775 A1 | 3/2017 | Kowles |
| 2017/0351602 A1 | 12/2017 | Oshimi et al. |
| 2018/0088811 A1 | 3/2018 | Kanno |
| 2019/0294376 A1 | 9/2019 | Park et al. |
| 2019/0317901 A1 | 10/2019 | Kachare et al. |
| 2020/0004432 A1 | 1/2020 | Sharon et al. |

FOREIGN PATENT DOCUMENTS

| | | |
|---|---|---|
| JP | 2011-128792 A | 6/2011 |
| KR | 10-2013-0031046 | 3/2013 |
| KR | 10-2015-0018688 A | 2/2015 |
| KR | 10-2015-0020136 | 2/2015 |
| KR | 10-2019-0111406 A | 10/2019 |

OTHER PUBLICATIONS

Matias Bjørling, 'Introduction to Open-Channel Solid State Drives and What's Next!' Western Digital, Sep. 2018.

Korean Office Action for corresponding Korean Patent Application No. 10-2020-21033 dated Feb. 3, 2021.

KR Notice of Allowance dated Jun. 3, 2021 for corresponding Korean Application No. 10-2020-0021033 and English translation thereof.

KR Notice of Non-Final Rejection dated Feb. 3, 2021 for corresponding Korean Application No. 10-2020-0021033 and English translation thereof.

Extended European Search Report for corresponding EP Patent Application No. 20217210.2 dated Jul. 5, 2021.

Fomi chev Dmitry: "Linux Zoned Block Device Ecosystem", Jan. 1, 2019 (Jan. 1, 2019), XP055815315, Retrieved from the Internet: URL: https://ostconf.com/system/attachments/files/000/001/700/original/Dmitry-Fomichev-Linux-Piter19-talk-v6.pdf?1570452830 <https://protect-us.mimecast.com/s/yxi1CADQNWCZ3mZIHGDC-R> [retrieved on Jun. 17, 2021] *p. 3—p. 7* *p. 15—p. 16* *p. 30—p. 33*.

CN Office Action dated Dec. 20, 2021 in Chinese Application No. 202110191767.7.

CN Notice of Allowance for corresponding Chinese Patent Application No. 202110191767.7 dated May 12, 2022.

\* cited by examiner

| Zone ID | ZSLBA | Zone Level | Comp Ratio (%) |
|---------|---------|------------|----------------|
| Zone 1  | ZSLBA 1 | Level 1    | 100            |
| Zone 2  | ZSLBA 2 | Level 2    | 75             |
| Zone 3  | ZSLBA 3 | Level 3    | 50             |

| LBA | Start PPN | Finish PPN | COMP |
|---|---|---|---|
| LBA 1 | PPN 1 | PPN 2 | Y |
| LBA 2 | PPN 3 | PPN 4 | N |
| ⋮ | ⋮ | ⋮ | ⋮ |
| LBA n | PPN 2n−1 | PPN 2n | Y |

STORAGE DEVICE AND OPERATING METHOD THEREOF

CROSS-REFERENCE TO RELATED APPLICATION

This U.S. non-provisional application claims the benefit of priority under 35 U.S.C. § 119 to Korean Patent Application No. 10-2020-0021033, filed on Feb. 20, 2020, in the Korean Intellectual Property Office, the disclosure of which is incorporated herein in its entirety by reference.

BACKGROUND

Various example embodiments of the inventive concepts relate to a storage device, a storage system, and/or an operating method thereof, and more particularly, to a storage device, a storage system, and/or an operating method thereof, which set a plurality of zones of a non-volatile memory on the basis of an attribute of write data, and compress and store the write data according to a compression method corresponding to the plurality of zones.

A data center may store various pieces of data by using a storage device, such as a solid state drive (SSD), etc., and may provide a service. SSDs may store hot data, which refers to data which is frequently accessed, and cold data, which refers to data which is relatively less accessed. SSDs based on the related art randomly store hot data and cold data without classification therebetween. Therefore, in the SSDs based on the related art, compression efficiency is reduced, and a write amplification factor (WAF) increases due to frequent garbage collection.

SUMMARY

Various example embodiments of the inventive concepts provide a storage device, a storage system, and/or an operating method thereof, which set a plurality of zones of a non-volatile memory based on an attribute of write data, and compress and store the write data based on a compression method corresponding to the plurality of zones.

According to an aspect of at least one example embodiment of the inventive concepts, there is provided a storage device including a non-volatile memory including a plurality of zones, the non-volatile memory configured to sequentially store data in at least one of the plurality of zones, and processing circuitry configured to, receive a first write command and first data from a host, the first write command including a first logical address, identify a first zone of the plurality of zones based on the first logical address, compress the first data based on compression settings corresponding to the first zone, and write the compressed first data to the first zone.

According to another aspect of at least one example embodiment of the inventive concepts, there is provided a storage system including a host and a storage device including a non-volatile memory and processing circuitry, the non-volatile memory including a plurality of zones and configured to sequentially store data, and the processing circuitry configured to control the non-volatile memory, wherein the host is configured to transfer write data and a write command including a logical address to the storage device, and the storage device is configured to, in response to the write command from the host, identify a first zone of the plurality of zones based on the logical address, compress the write data based on compression settings corresponding to the first zone, and write the compressed write data into the first zone.

According to another aspect of at least one example embodiment of the inventive concepts, there is provided an operating method of a storage device including a storage device including a non-volatile memory including a plurality of zones, the non-volatile memory configured to store data, the operating method including receiving, using processing circuitry, a first write command and first data from a host, identifying, using the processing circuitry, a first zone of the plurality of zones based on a first logical address included in the first write command, compressing, using the processing circuitry, the first data based on compression settings corresponding to the first zone, and writing the compressed first data into the first zone.

BRIEF DESCRIPTION OF THE DRAWINGS

Various example embodiments of the inventive concepts will be more clearly understood from the following detailed description taken in conjunction with the accompanying drawings in which.

DETAILED DESCRIPTION

Figure 1:
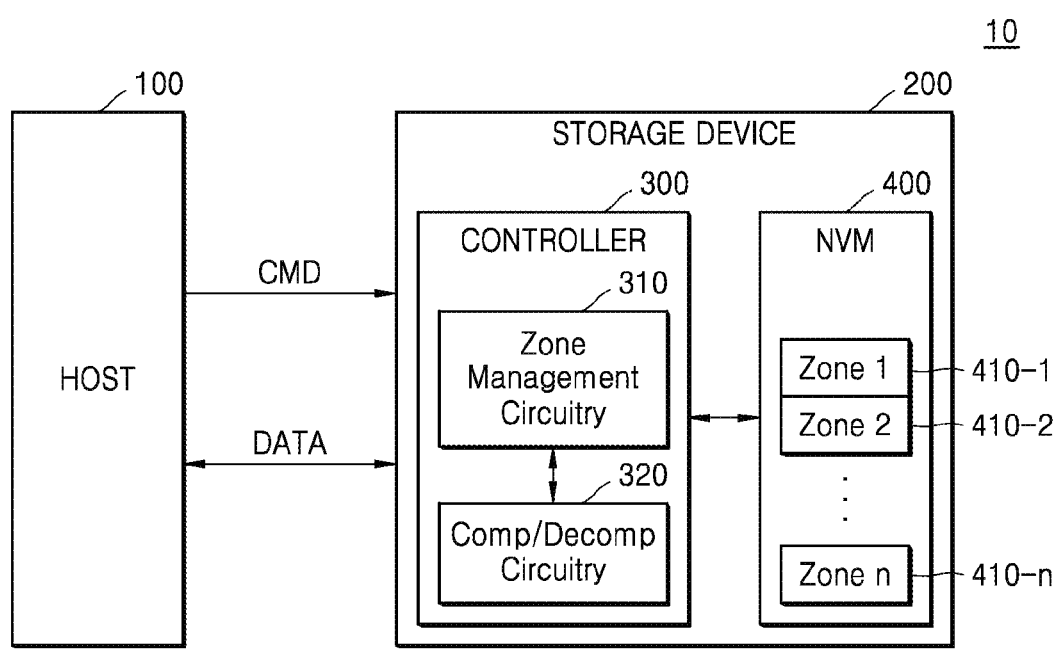
FIG. 1 is a block diagram illustrating a storage system according to at least one example embodiment.

FIG. 1 is a block diagram illustrating a storage system 10 according to at least one example embodiment.

Referring to FIG. 1, the storage system 10 may include a host 100 and/or a storage device 200, but the example embodiments are not limited thereto, and the storage system 10 may include a greater or lesser number of constituent components, such as a plurality of hosts, a plurality of storage devices, etc. Also, the storage device 200 may include a controller 300 (e.g., processing circuitry), a non-volatile memory (NVM) 400, etc., but is not limited thereto. According to some example embodiments, the controller 300 may include hardware such as logic circuits (e.g., processing circuitry, etc.); a hardware/software combination such as at least one processor core executing software and/or executing any instruction set; or a combination thereof. For example, the controller 300 more specifically may include, but is not limited to, a field programmable gate array (FPGA), a programmable logic unit, an application-specific integrated circuit (ASIC), a system-on-chip (SOC), an intellectual property (IP) block, etc. In at least one example embodiment, each of the controller 300 and the NVM 400 may be implemented as an individual chip, but is not limited thereto. Also, the controller 300 may include a zone management circuitry 310 (e.g., a zone management module, logic, component, etc.) and/or a compression/decompression circuitry 320 (compression/decompression module, logic, component, etc.), etc. According to at least one example embodiment, the zone management circuitry 310 and the compression/decompression circuitry 320 may be integrated, but the example embodiments are not limited thereto. Also, the NVM 400 may include a plurality of zones (Zone 1 to Zone n) 410-1 to 410-$n$, but is not limited thereto.

The storage system 10 may be implemented as, included in, and/or connected to, for example, a personal computer (PC), a data server, a network-attached storage, a smart device, an Internet of things (IoT) device, and/or a portable electronic device, but is not limited thereto. Examples of the portable electronic device may include laptop computers, mobile phones, smartphones, tablet PCs, personal digital assistants (PDAs), enterprise digital assistants (EDAs), digital still cameras, digital video cameras, audio devices, portable multimedia players (PMP), personal navigation devices (PNDs), MP3 players, handheld game consoles, e-books, wearable devices, virtual reality and/or augmented reality devices, etc.

The host 100 may perform at least one data management operation in the storage system 10. In at least one example embodiment, the host 100 may provide a data write request and/or a data read request, etc., to the storage device 200, and based on the request from the host 100, the storage device 200 may write data in the NVM 400, or may read data from the NVM 400 and provide the read data to the host 100, but is not limited thereto. Also, based on a data erase request from the host 100, the storage device 200 may perform an erase operation on data stored in a zone indicated by the host 100, etc.

The storage device 200 may include one or more storage mediums. For example, the storage device 200 may include one or more hard disk drives (HDDs) and/or SSDs, etc. When the storage device 200 includes an SSD, the storage device 200 may include a plurality of memory chips. For example, the storage device 200 may include a plurality of flash memory chips (for example, NAND memory chips), which non-volatilely store data. Additionally, the storage device 200 may correspond to at least one flash memory chip. Additionally, the storage device 200 may correspond to a memory card including one or more flash memory chips.

According to at least one example embodiment, a plurality of storage mediums included in the NVM 400 may be a plurality of storage spaces, and may be set to first to $n^{th}$ zones (Zone 1 to Zone n) 410-1 to 410-$n$, but the example embodiments are not limited thereto. Each zone may be variously defined, and for example, a size of each zone may be variously defined. For example, each of the plurality of zones 410-1 to 410-$n$ may include a plurality of blocks or a plurality of pages, but are not limited thereto. A page may correspond to a data write unit or a data read unit, and a block may include a plurality of pages. Therefore, each of the plurality of zones 410-1 to 410-$n$ may have a size which is greater than a data write unit or a data read unit. A size of each of the plurality of zones 410-1 to 410-$n$ is not limited to the above-described example, and sizes of the plurality of zones 410-1 to 410-$n$ may be the same as each other, or may differ from each other.

Each of the plurality of zones 410-1 to 410-$n$ of the NVM 400 may sequentially store data, but are not limited thereto. In detail, the plurality of zones 410-1 to 410-$n$ may not randomly store data and may store data sequentially from a first storage location of each zone, etc. For example, in a case where each of the plurality of zones 410-1 to 410-$n$ stores data for the first time, each of the plurality of zones 410-1 to 410-$n$ may store data sequentially from a first storage location of each zone. Also, in a case where each of the plurality of zones 410-1 to 410-$n$ additionally stores data (e.g., stores additional data), each of the plurality of zones 410-1 to 410-$n$ may identify a storage location at which data is lastly written (e.g., was most recently written, was previously written, etc.) and may store data sequentially from a storage location next and/or sequential to the identified storage location, etc.

Therefore, the host 100 may determine a zone where data is to be written and may transfer, to the storage device 200, a write request including a logical address (for example, a logical memory address representing a start address and/or location of a zone) corresponding to the determined zone. Also, the storage device 200 may identify a zone corresponding to the logical address included in the write request, identify a storage location at which data is lastly (e.g., most recently and/or previously) stored in the identified zone, and store received write data sequentially from a storage location next to the identified storage location. As described above, a storage space may be set to a plurality of zones, and the storage device 200, which sequentially stores data in each zone, may be referred to as a zoned namespaces (ZNS) storage, but the example embodiments are not limited thereto.

According to at least one example embodiment, the plurality of zones 410-1 to 410-$n$ of the NVM 400 may be set based on at least one attribute of write data. In at least one example embodiment, each of the plurality of zones 410-1 to 410-$n$ of the NVM 400 may be set based on the number of predicted accesses of written data (e.g., predicted number of write accesses) or the amount of data to be written. For example, the plurality of zones 410-1 to 410-$n$ may be set to a first zone (Zone 1) storing data (i.e., hot data) where the number of prediction accesses is high, a second zone (Zone 2) storing data (i.e., normal data) where the number of prediction accesses is medium, and a third zone (Zone 3)

storing data (i.e., cold data) where the number of prediction accesses is low. Therefore, the storage device 200 may divide and store the hot data and the cold data, thereby reducing, decreasing, and/or minimizing the amount of and/or frequency of garbage collection. A method of setting the plurality of zones 410-1 to 410-n is not limited to the above-described examples, and the plurality of zones 410-1 to 410-n may be set to fewer or more zones than three. For example, the number of predicted memory accesses may be determined by the host 100 and/or the memory controller 300 based on historical memory access patterns, analysis of instructions stored in instruction queue(s) (not shown) for a processor and/or processor core of the host 100 and/or the memory controller 300, etc., but the example embodiments are not limited thereto.

The controller 300 may include a zone management circuitry 310. The zone management circuitry 310 may manage the plurality of zones 410-1 to 410-n of the NVM 400, and/or may support a function of processing various requests for the plurality of zones 410-1 to 410-n, but is not limited thereto. In at least one example embodiment, the zone management circuitry 310 may set a storage space of the NVM 400 to the plurality of zones 410-1 to 410-n on the basis of at least one management command received from the host 100. For example, the zone management circuitry 310 may set the storage space of the NVM 400 to a first zone (Zone 1) storing hot data, a second zone (Zone 2) storing normal data, and a third zone (Zone 3) storing cold data on the basis of the management command received from the host 100. The above-described example is merely an example of a method of setting a storage space of the NVM 400 to a plurality of zones, and the example embodiments are not limited thereto.

Also, according to at least one example embodiment, the zone management circuitry 310 may set a compression method and/or a decompression method for each of the plurality of zones 410-1 to 410-n. In at least one example embodiment, the zone management circuitry 310 may set a compression ratio (a ratio of a compressed data size to an original data size) corresponding to each of the plurality of zones 410-1 to 410-n on the basis of the management command received from the host 100. For example, the zone management circuitry 310 may set a compression ratio for the first zone (Zone 1), storing hot data, to 100% (i.e., compression is not performed), set a compression ratio of the second zone (Zone 2), storing normal data, to 75%, and set a compression ratio of the third zone (Zone 3), storing cold data, to 50%, but the example embodiments are not limited thereto and any compression ratio may be set for each of the zones. Setting a compression ratio as an example of a compression method/decompression method is merely an example, and the example embodiments are not limited thereto. For example, a method of setting a compression method/decompression method may set various algorithms, such as a compression manner and/or compression algorithm, an encryption manner and/or algorithm, or a data compression unit (e.g., unit size of compression), may set the compression ratio automatically or dynamically based on storage device performance and/or conditions, use different compression algorithms for different zones, etc.

Also, according to at least one example embodiment, the zone management circuitry 310 may write and/or read data on the basis of the set compression method/decompression method. In at least one example embodiment, when a write request is received from the host 100, the zone management circuitry 310 may compress write data (e.g., data to be written to the NVM 400) on the basis of a compression ratio of a zone corresponding to the write request by using the compression/decompression circuitry 320 and may write the compressed write data in the zone corresponding to the write request. Also, when a read request is received from the host 100, the zone management circuitry 310 may read data from a zone corresponding to the read request, decompress the read data (e.g., the previously compressed data) on the basis of a compression ratio of the zone corresponding to the read request by using the compression/decompression circuitry 320, and transfer decompressed read data to the host 100.

The controller 300 may include the compression/decompression circuitry 320. The compression/decompression circuitry 320 may support a function of compressing and/or decompressing data. According to at least one example embodiment, the compression/decompression circuitry 320 may receive data from the zone management circuitry 310, compress the received data on the basis of a compression method and/or compression settings corresponding to a zone where the received data is to be written, and transfer the compressed data to the zone management circuitry 310. Also, the compression/decompression circuitry 320 may receive data from the zone management circuitry 310, decompress the received data on the basis of a decompression method and/or decompression settings corresponding to a zone from which the received data is read, and transfer the decompressed data to the zone management circuitry 310.

Therefore, the storage device 200 may adjust data input/output latency and the efficiency of a storage space of a storage device. For example, when a compression ratio of the first zone (Zone 1) storing the hot data is 100% (e.g., the data in Zone 1 is uncompressed) and a compression ratio of the third zone (Zone 3) storing the cold data is 50%, the storage device 200 may not perform compression and decompression of the hot data which is frequently accessed, and thus may quickly write and read the hot data (e.g., write and read data from Zone 1 at approximately the same speed as a conventional storage device), and moreover, the storage device 200 may perform compression on the cold data, which is relatively less accessed, on the basis of a high compression ratio, thereby increasing the efficiency of a storage space while reducing the decrease in speed in performing read and write operations on the storage device 200 relative to a storage device which compresses/decompresses all data stored on the device.

The zone management circuitry 310 and the compression/decompression circuitry 320 may each be implemented as various types and may be included in and/or integrated with the controller 300. For example, the zone management circuitry 310 or the compression/decompression circuitry 320 may be implemented with hardware such as a logic circuit, processing circuitry, etc., for performing at least one support function related to the zone management method and the compression/decompression method of the example embodiments, respectively. Additionally, the zone management circuitry 310 and/or the compression/decompression circuitry 320 may be implemented as a combination of hardware and software, for example a software program (e.g., program code, firmware, computer readable instructions, etc.) loaded into and executed by processing circuitry included in the controller 300 may execute the functionality of the zone management circuitry 310 or the compression/decompression circuitry 320 as discussed with respect to at least one example embodiment.

As described above, the storage system 10 according to at least one example embodiment may set the storage space of the NVM 400 to the plurality of zones 410-1 to 410-n on the basis of the number of prediction accesses of data (e.g., predicted number of accesses and/or data operations) and may compress write data (e.g., data to be written) on the basis of a compression method, settings, and/or algorithm corresponding to each of the plurality of zones 410-1 to 410-n, or may decompress read data (e.g., data stored on the NVM 400) on the basis of a decompression method, settings, and/or algorithm corresponding to each of the plurality of zones 410-1 to 410-n. That is, the storage system 10 may divide and store the hot data and the cold data in different zones, and thus may have an effect of reducing a write amplification factor (WAF) by decreasing and/or minimizing garbage collection, and moreover, the storage system 10 may compress and store the hot data and the cold data at different compression ratios, and thus may appropriately and/or beneficially adjust the tradeoff between data input/output latency and the compression efficiency of the storage space.

According to a modifiable example embodiment, the zone management circuitry 310 may set the plurality of zones 410-1 to 410-n for each user of the storage device 200, based on a command received from the host 100. For example, the zone management circuitry 310 may set a first zone (Zone 1) storing data associated with a first user (and/or a first host), a second zone (Zone 2) storing data associated with a second user (and/or a second host), and a third zone (Zone 3) storing data associated with a third user (and/or third host), etc., but the example embodiments are not limited thereto, and for example, two or more of the zones may be associated with a single user/host, or a single zone may be associated with two or more users/hosts, etc.

Also, the zone management circuitry 310 may set a compression method (e.g., compression settings, algorithms, etc.) and/or a decompression method (e.g., settings, algorithms, etc.) corresponding to each of the plurality of zones 410-1 to 410-n set for each user (and/or host), based on a command received from the host 100. For example, the zone management circuitry 310 may set a compression ratio of the first zone (Zone 1) to 100% on the basis of a request of the first user who prefers and/or selects a fast input/output and may set a compression ratio of the third zone (Zone 3) to 50% on the basis of a request of the third user who prefers and/or selects the high efficiency of a storage space, etc.

As described above, the storage system 10 according to at least one example embodiment may set the storage space of the NVM 400 to the plurality of zones 410-1 to 410-n on the basis of a user and/or host and may individually set a compression method corresponding to each of the plurality of zones 410-1 to 410-n on the basis of a selection and/or preference of the user and/or host, thereby providing a customized service to the user and/or host.

Figure 2:
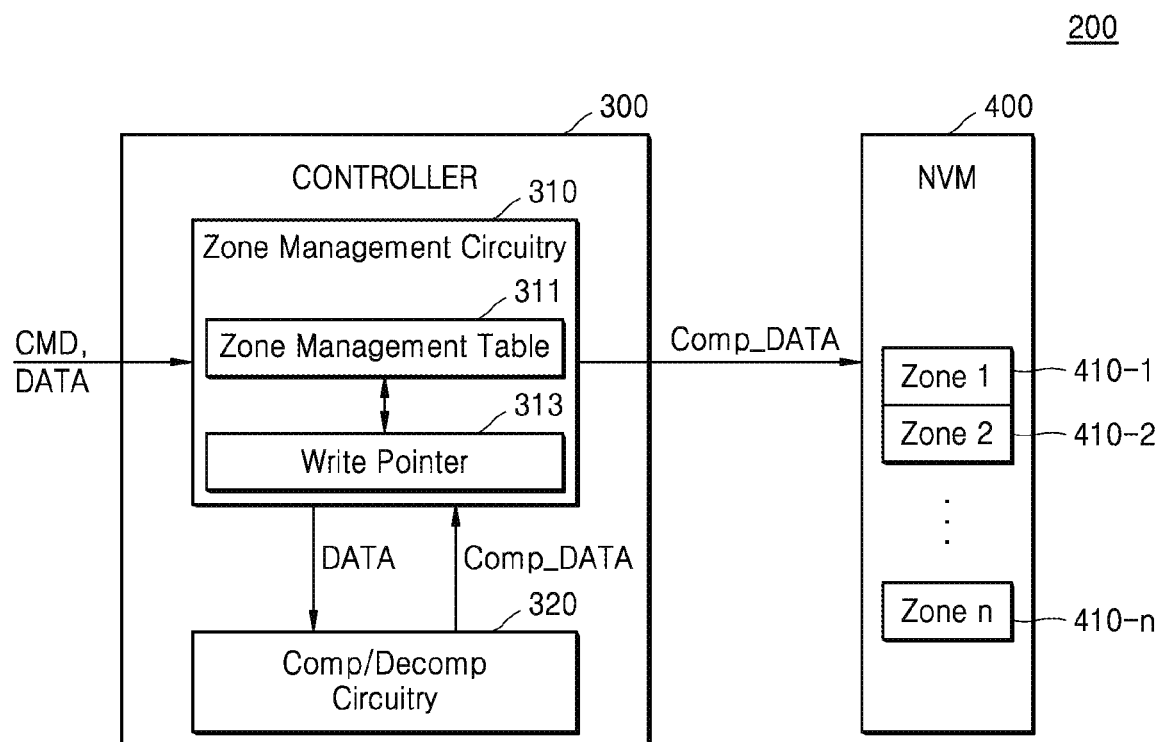
FIG. 2 is a block diagram illustrating a storage device according to at least one example embodiment.

FIG. 2 is a block diagram illustrating a storage device 200 according to at least one example embodiment.

Referring to FIGS. 1 and 2, the storage device 200 may include a controller 300 (e.g., processing circuitry, etc.) and/or an NVM 400, but is not limited thereto. Also, the controller 300 may include a zone management circuitry 310 and/or a compression/decompression circuitry 320, and the NVM 400 may include a plurality of zones 410-1 to 410-n, but they are not limited thereto. In at least one example embodiment, the zone management circuitry 310 may include a zone management table 311 and/or a write pointer 313, but is not limited thereto.

The zone management table 311 may be a table, list, database, etc., which includes information about a compression method corresponding to each of the plurality of zones 410-1 to 410-n. For example, the zone management table 311 may include information about a compression ratio corresponding to each of the plurality of zones 410-1 to 410-n. A detailed description of the zone management table 311 will be given below with reference to FIG. 3. In at least one example embodiment, when a write command CMD and write data DATA are received from the host 100, the zone management circuitry 310 may identify a zone for writing the write data DATA on the basis of a logical address (e.g., memory address) included in the write command CMD, and may identify a compression method corresponding to a zone identified based on the zone management table 311. Also, the zone management circuitry 310 may transfer the write data DATA and information about a compression method to the compression/decompression circuitry 320 to request compression of the write data DATA based on the compression method, setting, algorithm, etc.

Based on a request of the zone management circuitry 310, the compression/decompression circuitry 320 may compress the received write data DATA on the basis of the transferred information about the compression method to generate compression data (e.g., compressed data) Comp_DATA. For example, when the transferred information about the compression method includes information representing a compression ratio of 75% (e.g., the data being 25% compressed), the compression/decompression circuitry 320 may compress the write data DATA by 25% to generate the compression data (e.g., compressed data) Comp_DATA. According to some example embodiments, as a result of the inclusion of the compression method (e.g., compression settings, algorithms, etc.) in the received write data DATA, the compression/decompression circuitry 320 compresses the write data DATA to generate the compression data Comp_DATA, and a real and/or actual compression ratio of the compression data Comp_DATA may be lower than a received compression ratio (e.g., more compressed), but is not limited thereto. That is, the write data DATA may be more compressed than the target amount of compression and/or desired compression ratio, due to the compression method, settings, and/or algorithm used, and/or the composition of the data received, etc. In this case, the compression/decompression circuitry 320 may add dummy data to the compressed write data DATA so that the real and/or actual compression ratio of the compression data Comp_DATA is equal to the received compression ratio, thereby generating the compression data (e.g., compressed data) Comp_DATA. Also, the compression/decompression circuitry 320 may transfer the compression data (e.g., compressed data) Comp_DATA to the zone management circuitry 310.

According to other example embodiments, a result of the compression/decompression circuitry 320 compressing the write data DATA to generate the compression data Comp_DATA, may lead to the real compression ratio of the compression data Comp_DATA being higher than the compression ratio received from the zone management circuitry 310. That is, the write data DATA may not be compressed to the same compression ratio as the target compression ratio. Therefore, when the compression data Comp_DATA is received from the compression/decompression circuitry 320, the zone management circuitry 310 may identify a real (e.g., actual) compression ratio of the received compression data Comp_DATA and may compare the real compression ratio with a target compression ratio corresponding to a zone where the compression data Comp_DATA is to be written.

For example, when the real compression ratio is higher than the target compression ratio associated with a target zone (e.g., the zone where the write data DATA is to be written), the zone management circuitry 310 may read the write data DATA from a buffer (not shown), which temporarily stores the write data DATA received from the host 100, and may determine that the write data DATA, instead of the compression data Comp_DATA, is to be written into the zone. On the other hand, when the real compression ratio matches the target compression ratio, the zone management circuitry 310 may determine that the compression data Comp_DATA received from the compression/decompression circuitry 320 is to be written into the zone.

The zone management circuitry 310 may write data (e.g., the write data DATA or the compression data Comp_DATA), determined to be written, in the NVM 400 by using the write pointer 313. According to some example embodiments, the write pointer 313 may be a plurality of pointers and each of the plurality of pointers may be associated with and/or correspond to a respective zone of the NVM 400. Here, the write pointer 313 may denote a pointer representing a storage location at which data is lastly stored (and/or most recently stored) in each zone. In at least one example embodiment, the zone management circuitry 310 may identify the write pointer 313 of a zone where data is to be written. Also, the zone management circuitry 310 may transfer the write data DATA or the compression data Comp_DATA to the NVM 400, and simultaneously (and/or sequentially), may control the NVM 400 to write data at a next storage location of the identified write pointer 313.

In the illustration and description of FIG. 2, it is illustrated and described that the zone management circuitry 310 includes the zone management table 311 and the write pointer 313, but the zone management table 311 and/or the write pointer 313 may be loaded into a separate memory (for example, dynamic random access memory (DRAM), an external cache memory, etc.) of the controller 300.

Figure 3:
FIG. 3 is a diagram illustrating a zone management table according to at least one example embodiment.

FIG. 3 is a diagram illustrating a zone management table ZMT according to at least one example embodiment.

Referring to FIGS. 1 and 3, the zone management table ZMT according to at least one example embodiment may include information about a logical address (and/or memory address) ZSLBA, a zone identification (ID) (Zone ID), a zone level (Zone Level), and a compression ratio (Comp Ratio) of each of a plurality of zones 410-1 to 410-$n$. As described above with reference to FIG. 2, the storage device 200 may compress data on the basis of a compression method, settings, algorithm, etc., corresponding to each zone with reference to the zone management table ZMT. Hereinafter, for convenience of description, it may be assumed that the plurality of zones 410-1 to 410-$n$ of the NVM 400 include three zones.

According to at least one example embodiment, the zone ID (Zone ID) of each of the plurality of zones 410-1 to 410-$n$ may denote a name, a number, and/or any other unique identifier representing each zone. For example, referring to FIG. 3, the zone management table ZMT may include a first zone Zone 1, a second zone Zone 2, and a third zone Zone 3 as IDs of three zones, but the example embodiments are not limited thereto. Moreover, according to at least one example embodiment, the logical address ZSLBA of each of the plurality of zones 410-1 to 410-$n$ may denote a logical address representing each zone or representing a start location of each zone. In at least one example embodiment, the logical address ZSLBA of each of the plurality of zones 410-1 to 410-$n$ may be implemented as a logical address of a first block or a first page of each zone. For example, referring to FIG. 3, the zone management table ZMT may include a logical address ZSLBA 1 of the first zone Zone 1, a logical address ZSLBA 2 of the second zone Zone 2, and a logical address ZSLBA 3 of the third zone Zone 3. However, the example embodiments are not limited thereto, and for example, a physical memory address may be used instead of, or in addition to, the logical address, etc.

Moreover, according to at least one example embodiment, a zone level (Zone Level) of each of the plurality of zones 410-1 to 410-$n$ may represent the degree of compression of data written in each zone. For example, referring to FIG. 3, the zone management table ZMT may include a plurality of level designations, such as Level 1, which is a level of the first zone Zone 1 storing hot data and is a level for performing compression with high compression ratio (e.g., the data is not compressed, or compressed to a small degree, etc.), Level 2, which is a level of the second zone Zone 2 storing normal data and is a level for performing compression with lower compression ratio than the Level 1 (e.g., the data stored in Zone 2 is more compressed than the data stored in Zone 1, but less compressed than the data in Zone 3, etc.), and Level 3, which is a level of the third zone Zone 3 storing cold data and is a level for performing compression with the lowest compression ratio (e.g., the data stored in Zone 3 is the most compressed and/or highly compressed, etc.), but the example embodiments are not limited thereto, and there may be a greater or lesser number of compression levels, etc.

According to at least one example embodiment, the compression ratio (Comp Ratio) of each of the plurality of zones 410-1 to 410-$n$ may represent a ratio of a size of compressed data to an original size of data written in each zone. For example, referring to FIG. 3, the zone management table ZMT may include 100% as a compression ratio of the first zone Zone 1 (e.g., the file size of the "compressed data" is the same as the original file size), 75% as a compression ratio of the second zone Zone 2 (e.g., the file size of the "compressed data" is 25% smaller than the file size of the original file), and 50% as a compression ratio of the third zone Zone 3 (e.g., the file size of the "compressed data" is 50% smaller than the file size of the original file), etc., but the example embodiments are not limited thereto, and for example, other compression ratios may be used, etc.

In the illustration and description of FIG. 3, the zone management table ZMT includes the information about the logical address ZSLBA, the zone ID (Zone ID), the zone level (Zone Level), and the compression ratio (Comp Ratio) of each of the plurality of zones 410-1 to 410-$n$, but the example embodiments are not limited thereto, and one or more items may be omitted and/or modified, or a separate item may be added, etc.

According to at least one example embodiment, the zone management circuitry 310 may generate the zone management table ZMT on the basis of control and/or based on instructions transmitted by the host 100. For example, the host 100 may transfer, to the zone management circuitry 310, setting information for setting the storage space of the NVM 400 to the plurality of zones 410-1 to 410-$n$ on the basis of a data attribute (for example, the number of prediction accesses (e.g., predicted accesses)) and a management command including information about a compression method (for example, a compression ratio) of each of the plurality of zones 410-1 to 410-$n$. Also, the zone management circuitry 310 may set the plurality of zones 410-1 to 410-$n$ on the basis of the management command received from the host 100, and may generate the zone management table ZMT used to manage the plurality of zones 410-1 to 410-$n$. The generated zone management table ZMT may be stored in the NVM 400, and then, may be loaded into the zone management circuitry 310, etc.

In a storage device based on the related art, a controller checks an attribute of data to determine a compression method, and then, compresses and writes data on the basis of the determined compression method. Due to this, the storage device based on the related art has a problem where the overhead of latency caused by an operation of checking an attribute of data increases the time required to complete every write operation performed by the conventional memory controller.

On the other hand, in at least one example embodiment, when a host checks an attribute of data to determine a zone where data is to be written and transfers a command including a logical address of the determined zone to the storage device 200, the storage device 200 may identify a compression method on the basis of a logical address and the zone management table ZMT, and may compress and write data on the basis of the identified compression method. Therefore, the storage device 200 according to at least one example embodiment may omit an operation needed for checking the data attributes of the data being written for each write operation, thereby decreasing latency caused by a write operation.

Hereinafter, an operation of compressing data by using the zone management table ZMT and writing the compressed data will be described in detail with reference to FIGS. 4 to 9.

Figure 4:
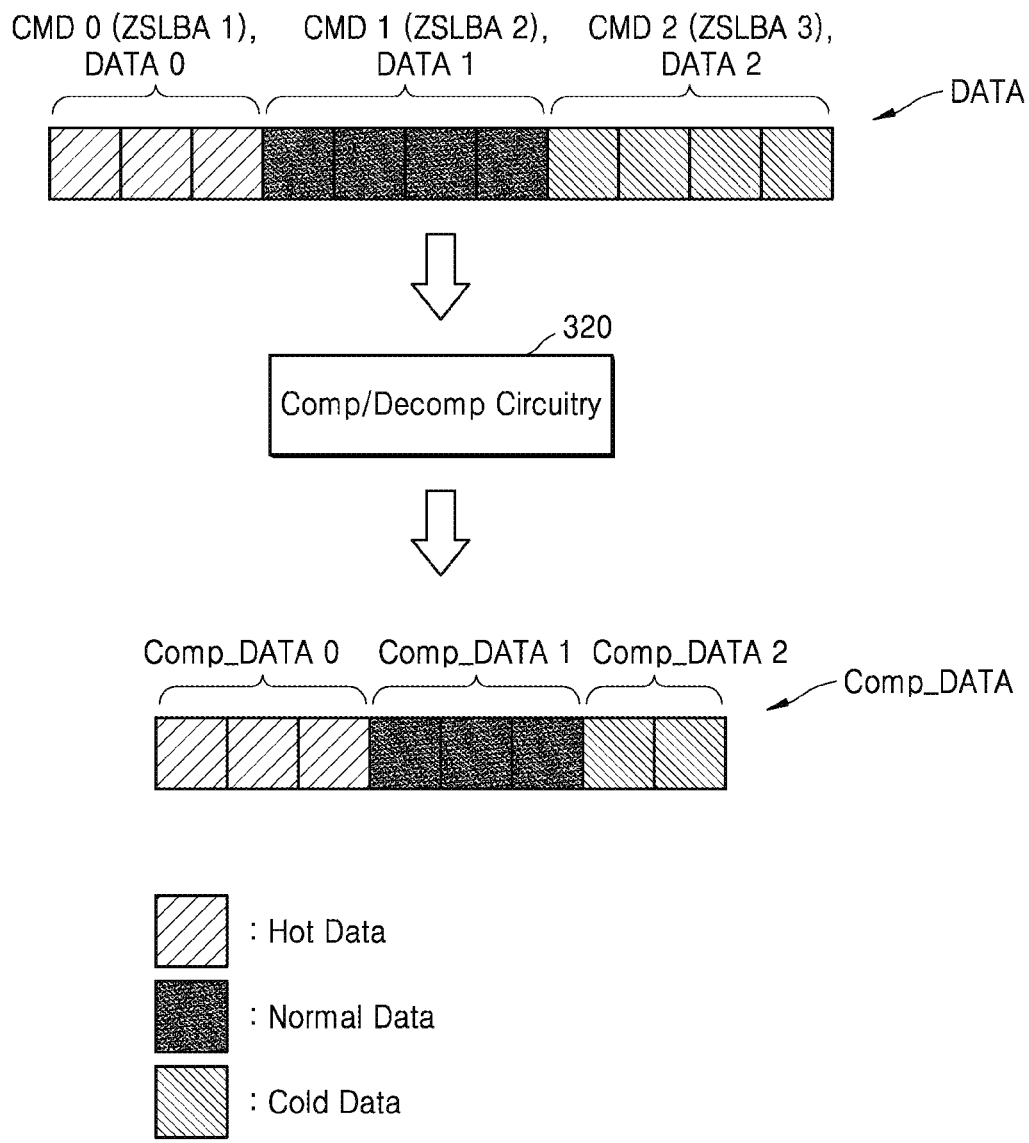
FIG. 4 is a conceptual diagram illustrating a data compression operation according to at least one example embodiment.

FIG. 4 is a conceptual diagram illustrating a data compression operation according to at least one example embodiment. In detail, FIG. 4 is a diagram illustrating a data compression operation performed on the zone management circuitry 310 and the compression/decompression circuitry 320 of FIGS. 1 and 2.

Referring to FIG. 4, the zone management circuitry 310 may receive commands CMD 0, CMD 1, and CMD 2 and pieces of data DATA 0, DATA 1, and DATA 2 from the host 100, but the example embodiments are not limited thereto. In this example, the pieces of data DATA 0, DATA 1, and DATA 2 received from the host 100 may include hot data, normal data, and cold data, but are not limited thereto. The data DATA 0 corresponding to the command CMD 0 may be the hot data, and the command CMD 0 may include a logical address ZSLBA 1 of a first zone Zone 1. The data DATA 1 corresponding to the command CMD 1 may be the normal data, and the command CMD 1 may include a logical address ZSLBA 2 of a second zone Zone 2. The data DATA 2 corresponding to the command CMD 2 may be the cold data, and the command CMD 2 may include a logical address ZSLBA 3 of a third zone Zone 3.

According to at least one example embodiment, the zone management circuitry 310 may identify the logical addresses ZSLBA 1, ZSLBA 2, and ZSLBA 3 of a zone from the received commands CMD 0, CMD 1, and CMD 2, etc. Also, the zone management circuitry 310 may identify a compression method corresponding to each of the identified logical addresses ZSLBA 1, ZSLBA 2, and ZSLBA 3 on the basis of and/or using the zone management table ZMT. For example, referring to FIGS. 3 and 4, the zone management circuitry 310 may identify a compression ratio of 100% corresponding to the logical address ZSLBA 1 of the first zone Zone 1, identify a compression ratio of 75% corresponding to the logical address ZSLBA 2 of the second zone Zone 2, and identify a compression ratio of 50% corresponding to the logical address ZSLBA 3 of the first zone Zone 3, with reference to the zone management table ZMT, etc.

Also, the zone management circuitry 310 may transfer a compression method, corresponding to the pieces of data DATA 0, DATA 1, and DATA 2, to the compression/decompression circuitry 320 to request compression. For example, the zone management circuitry 310 may issue a request, to the compression/decompression circuitry 320, to compress the data DATA 0 at a compression ratio of 100%, compress the data DATA 1 at a compression ratio of 75%, and compress the data DATA 2 at a compression ratio of 50%.

In FIG. 4, for convenience of description, it is illustrated and described that, as the zone management circuitry 310 transfers data to the compression/decompression circuitry 320 to request compression of the data, the zone management circuitry 310 transfers the data DATA 0 corresponding to a compression ratio of 100%. However, a compression ratio of 100% denotes that compression is not needed, and thus, the zone management circuitry 310 may be implemented so that an operation of transferring data corresponding to a compression ratio of 100% to the compression/decompression circuitry 320 is omitted, etc.

Also, based on a request of the zone management circuitry 310, the compression/decompression circuitry 320 may compress the pieces of data DATA 0, DATA 1, and DATA 2 on the basis of information about a received compression method to generate pieces of compression data Comp_DATA 0, Comp_DATA 1, and Comp_DATA 2. For example, referring to FIGS. 3 and 4, the compression/decompression circuitry 320 may compress the data DATA 0 at a compression ratio of 100% to generate the compression data Comp_DATA 0, compress the data DATA 1 at a compression ratio of 75% to generate the compression data Comp_DATA 1, and compress the data DATA 2 at a compression ratio of 50% to generate the compression data Comp_DATA 2.

In FIG. 4, for convenience of description, it is illustrated and described that, as the compression/decompression circuitry 320 compresses the received data, the compression/decompression circuitry 320 transfers the data DATA 0 corresponding to a compression ratio of 100%. However, the compression/decompression circuitry 320 may be implemented so that an operation of transferring data corresponding to a compression ratio of 100% to the compression/decompression circuitry 320 is omitted. Also, the compression/decompression circuitry 320 may transfer the generated pieces of compression data Comp_DATA 0, Comp_DATA 1, and Comp_DATA 2 to the zone management circuitry 310.

The compression/decompression circuitry 320 may compress data using various size units according to at least one example embodiment in compressing data. For example, the compression/decompression circuitry 320 may perform compression by a write command unit (e.g., a unit size designated in the write command), or may perform compression by a desired unit and/or minimum unit (for example, a block unit) of writing data into a zone, but the example embodiments are not limited thereto. This will be described below in detail with reference to FIGS. 5 and 6.

Figure 5:
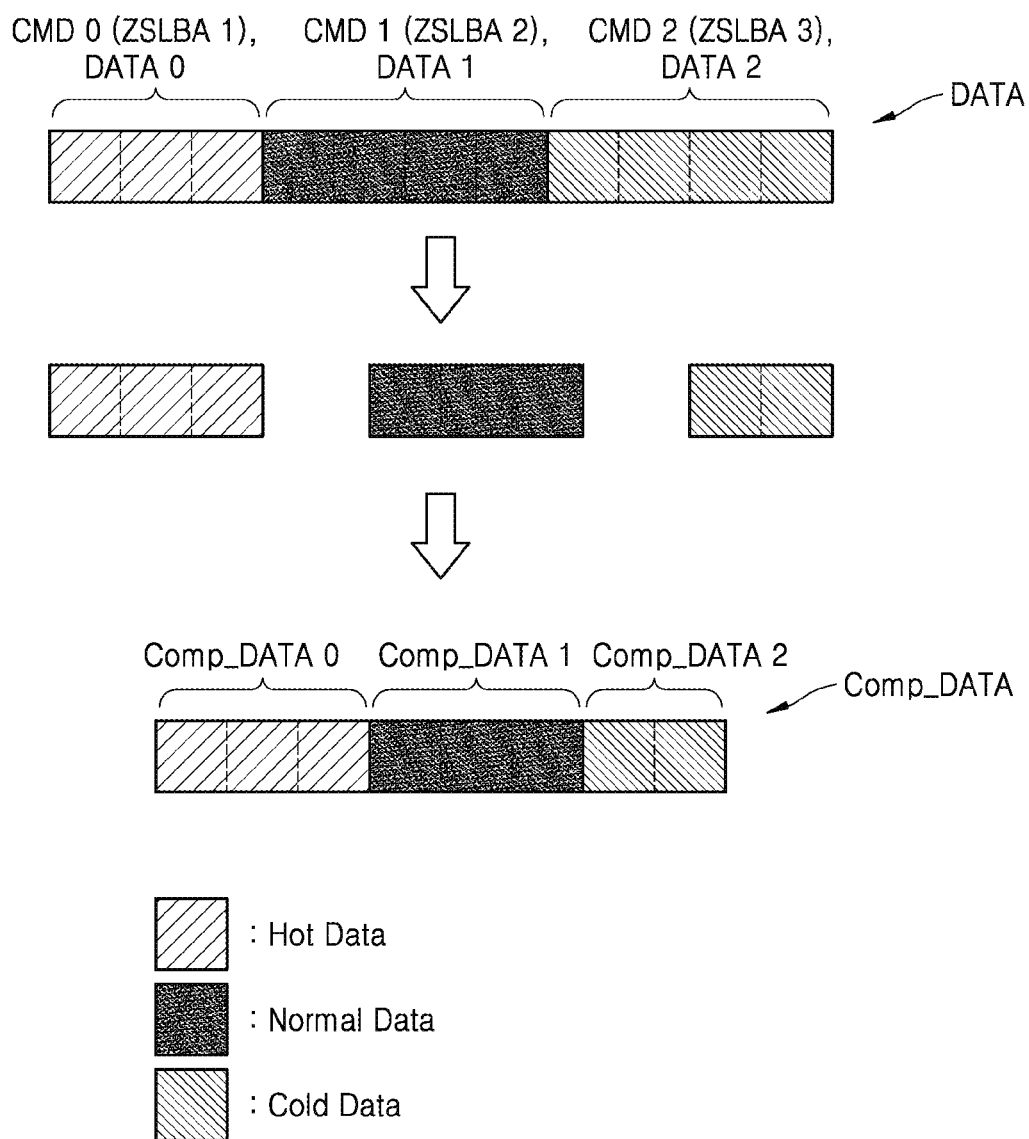
FIG. 5 is a conceptual diagram illustrating a data compression operation based on a write command unit according to at least one example embodiment.

FIG. 5 is a conceptual diagram illustrating a data compression operation based on a write command unit, according to at least one example embodiment. In detail, FIG. 5 is a diagram illustrating a data compression operation performed by the zone management circuitry 310 and the compression/decompression circuitry 320 of FIGS. 1 and 2. Hereinafter, a method of compressing data by a write command unit by using the compression/decompression circuitry 320 according to at least one example embodiment will be described.

The compression/decompression circuitry 320 may receive pieces of data DATA 0, DATA 1, and DATA 2, etc., corresponding to a plurality of commands CMD 0, CMD 1, and CMD 2, etc. Also, the compression/decompression circuitry 320 may compress the pieces of data DATA 0, DATA 1, and DATA 2 by a plurality of command CMD 0, CMD 1, and CMD 2 units.

For example, referring to FIG. 5, the compression/decompression circuitry 320 may identify the data DATA 0 corresponding to the command CMD 0 and may perform compression on all of the identified data DATA 0. Also, the compression/decompression circuitry 320 may identify the data DATA 1 corresponding to the command CMD 1 and may perform compression on all of the identified data DATA 1. Also, the compression/decompression circuitry 320 may identify the data DATA 2 corresponding to the command CMD 2 and may perform compression on all of the identified data DATA 2.

As a result of compression of the pieces of data DATA 0, DATA 1, and DATA 2 by the compression/decompression circuitry 320, a real (e.g., actual) compression ratio may be lower than a received compression ratio. In this case, the compression/decompression circuitry 320 may add dummy data to the compressed pieces of data DATA 0, DATA 1, and DATA 2 to generate pieces of compression data Comp_DATA 0, Comp_DATA 1, and Comp_DATA 2 having the received compression ratio, but the example embodiments are not limited thereto.

For example, referring to FIG. 5, when the real compression ratio is 65% as a result of compression performed on all of the data DATA 1, the compression/decompression circuitry 320 may add the dummy data to the compressed data DATA 1 to finally generate the compression data Comp_DATA 1 having a compression ratio of 75%. Also, when the real compression ratio is 40% as a result of compression performed on all of the data DATA 2, the compression/decompression circuitry 320 may add the dummy data to the compressed data DATA 2 to finally generate the compression data Comp_DATA 2 having a compression ratio of 50%, etc.

Figure 6:
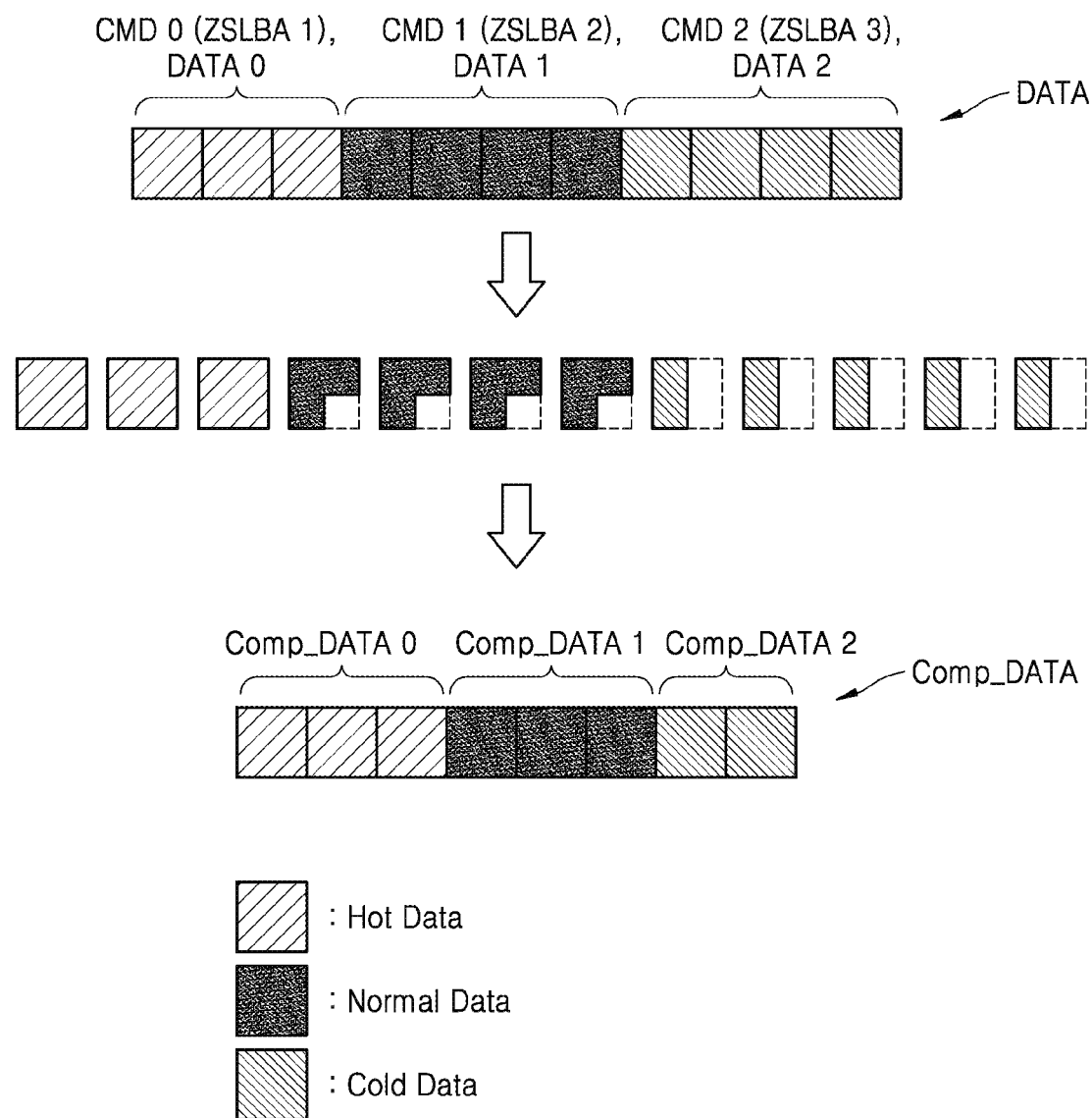
FIG. 6 is a conceptual diagram illustrating a data compression operation based on a block unit according to at least one example embodiment.

FIG. 6 is a conceptual diagram illustrating a data compression operation based on a block unit, according to at least one example embodiment. In detail, FIG. 6 is a diagram illustrating a data compression operation performed by the zone management circuitry 310 and the compression/decompression circuitry 320 of FIGS. 1 and 2. Hereinafter, a method of compressing data by block units by using the compression/decompression circuitry 320 according to at least one example embodiment will be described.

The compression/decompression circuitry 320 may receive pieces of data DATA 0, DATA 1, and DATA 2 corresponding to a plurality of commands CMD 0, CMD 1, and CMD 2. Also, the compression/decompression circuitry 320 may compress the pieces of data DATA 0, DATA 1, and DATA 2 by block units, but is not limited thereto.

For example, referring to FIG. 5, the compression/decompression circuitry 320 may perform compression on each of a plurality of blocks (e.g., three blocks, etc.) constituting the data DATA 0. Also, the compression/decompression circuitry 320 may perform compression on each of a plurality of blocks (e.g., four blocks, etc.) constituting the data DATA 1. Also, the compression/decompression circuitry 320 may perform compression on each of a plurality of blocks (e.g., four blocks, etc) constituting the data DATA 2.

As a result of compressing each of a plurality of blocks constituting the pieces of data DATA 0, DATA 1, and DATA 2 by the compression/decompression circuitry 320, a real compression ratio may be lower than a received compression ratio. In this case, the compression/decompression circuitry 320 may add dummy data to each of the compressed blocks to generate pieces of compression data Comp_DATA 0, Comp_DATA 1, and Comp_DATA 2 having the received compression ratio.

For example, referring to FIG. 6, when a real compression ratio (e.g., actual compression ratio, etc.) of at least one compressed block is 65% as a result of compression performed on each of a plurality of blocks constituting the data DATA 1, the compression/decompression circuitry 320 may add the dummy data to the at least one compressed block to generate the compression data Comp_DATA 1 having a compression ratio of 75%. Also, when a real compression ratio of at least one compressed block is 40% as a result of compression performed on each of a plurality of blocks constituting the data DATA 2, the compression/decompression circuitry 320 may add the dummy data to the at least one compressed block to finally generate the compression data Comp_DATA 2 having a compression ratio of 50%. However, the example embodiments are not limited thereto, and according to some example embodiments, no dummy data is added to the compression data even if the real compression ratio is not equal to the target compression ratio, etc.

In the illustration and description of FIG. 6, it is illustrated and described that the compression/decompression circuitry 320 compresses data by block units, but the example embodiments are not limited thereto, and for example, the compression/decompression circuitry 320 may compress data by page units or the like.

Figure 7:
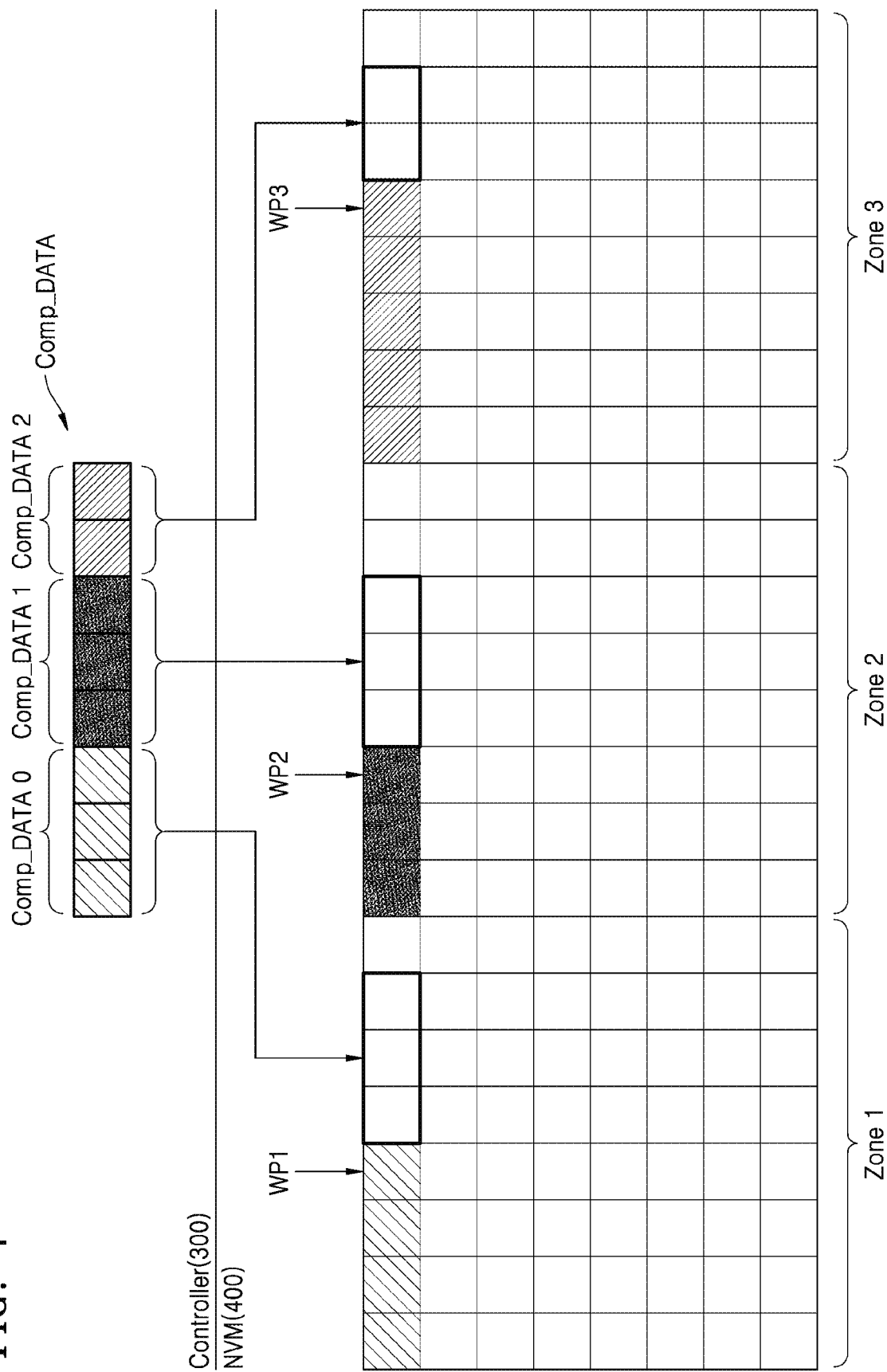
FIG. 7 is a conceptual diagram illustrating a data write operation according to at least one example embodiment.

FIG. 7 is a conceptual diagram illustrating a data write operation according to at least one example embodiment. In detail, FIG. 7 is a diagram illustrating a data write operation performed by the zone management circuitry 310 of FIGS. 1 and 2.

Referring to FIGS. 4 and 7, the zone management circuitry 310 may write pieces of compression data Comp_DATA 0, Comp_DATA 1, and Comp_DATA 2, received from the compression/decompression circuitry 320, in the NVM 400, but is not limited thereto. In at least one example embodiment, the zone management circuitry 310 may write, (e.g., sequentially write, write in parallel, etc.) the pieces of compression data Comp_DATA 0, Comp_DATA 1, and Comp_DATA 2 in a plurality of zones (for example, first to third zones) Zone 1, Zone 2, and Zone 3 corresponding to the pieces of compression data Comp_DATA 0, Comp_DATA 1, and Comp_DATA 2 by using a plurality of write pointers WP1, WP2, and WP3.

For example, the zone management circuitry 310 may identify the write pointer WP1 of the first zone Zone 1 corresponding to a logical address ZSLBA 1 of a zone included in a command CMD 0 and may write the compression data Comp_DATA 0 at a next storage location of the identified write pointer WP1. Also, the zone management circuitry 310 may identify the write pointer WP2 of the second zone Zone 2 corresponding to a logical address ZSLBA 2 of a zone included in a command CMD 1 and may write the compression data Comp_DATA 1 at a next storage location of the identified write pointer WP2. Also, the zone management circuitry 310 may identify the write pointer WP3 of the second zone Zone 3 corresponding to a logical address ZSLBA 3 of a zone included in a command CMD 2 and may write the compression data Comp_DATA 2 at a next storage location of the identified write pointer WP3.

In the illustration and description of FIG. 7, it is illustrated and described that the zone management circuitry 310 writes compression data received from the compression/decompression circuitry 320, but according to some example embodiments, the zone management circuitry 310 may write uncompressed write data instead of the received compression data.

In detail, the zone management circuitry 310 may receive compression data and information about a real compression ratio of the compression data from the compression/decompression circuitry 320. For example, in a case where the compression/decompression circuitry 320 performs compression based on and/or using a write command unit, the zone management circuitry 310 may receive information about a real compression ratio for each compression data corresponding to a write command. Also, the zone management circuitry 310 may compare a real compression ratio with a target compression ratio corresponding to a zone to write, for each compression data and may write compression data or write data on the basis of a result of the comparison.

For example, when a real compression ratio of the compression data Comp_DATA 1 received from the compression/decompression circuitry 320 is 85% and is higher than a target compression ratio of 75%, the zone management circuitry 320 may read before-write data DATA 1 from a buffer and may write the read data DATA 1 in a zone. As another example, when a real compression ratio of the compression data Comp_DATA 2 received from the compression/decompression circuitry 320 is 50% and is equal to a target compression ratio of 50%, the zone management circuitry 320 may write the compression data Comp_DATA 2 in a zone.

In a case where the compression/decompression circuitry 320 performs compression by block units, the zone management circuitry 310 may compare a real compression ratio with a target compression ratio corresponding to a zone to write, for each block and may write compression data or write data on the basis of a result of the comparison.

For example, referring to FIG. 6, when a real compression ratio of a first block of a plurality of blocks (e.g., two blocks, etc.) constituting the compression data Comp_DATA 2 is 60% and is higher than a target compression ratio of 50%, the zone management circuitry 320 may write a plurality of blocks, corresponding to the first block among before-compression data DATA 2, in a zone. Also, when a real compression ratio of a second block constituting the compression data Comp_DATA 2 is 50% and is equal to a target compression ratio of 50%, the zone management circuitry 320 may write a second block in a zone, etc.

As described above, the zone management circuitry 320 may determine data which is to be written, based on a real compression rate for each block, and thus, may write compressed data and uncompressed data in a zone. Therefore, for convenience of management, the zone management circuitry 310 may change the ordering of pieces of data to divide the pieces of data into compressed data and uncompressed data, and may write the compressed data and the uncompressed data in a zone.

Figure 8:
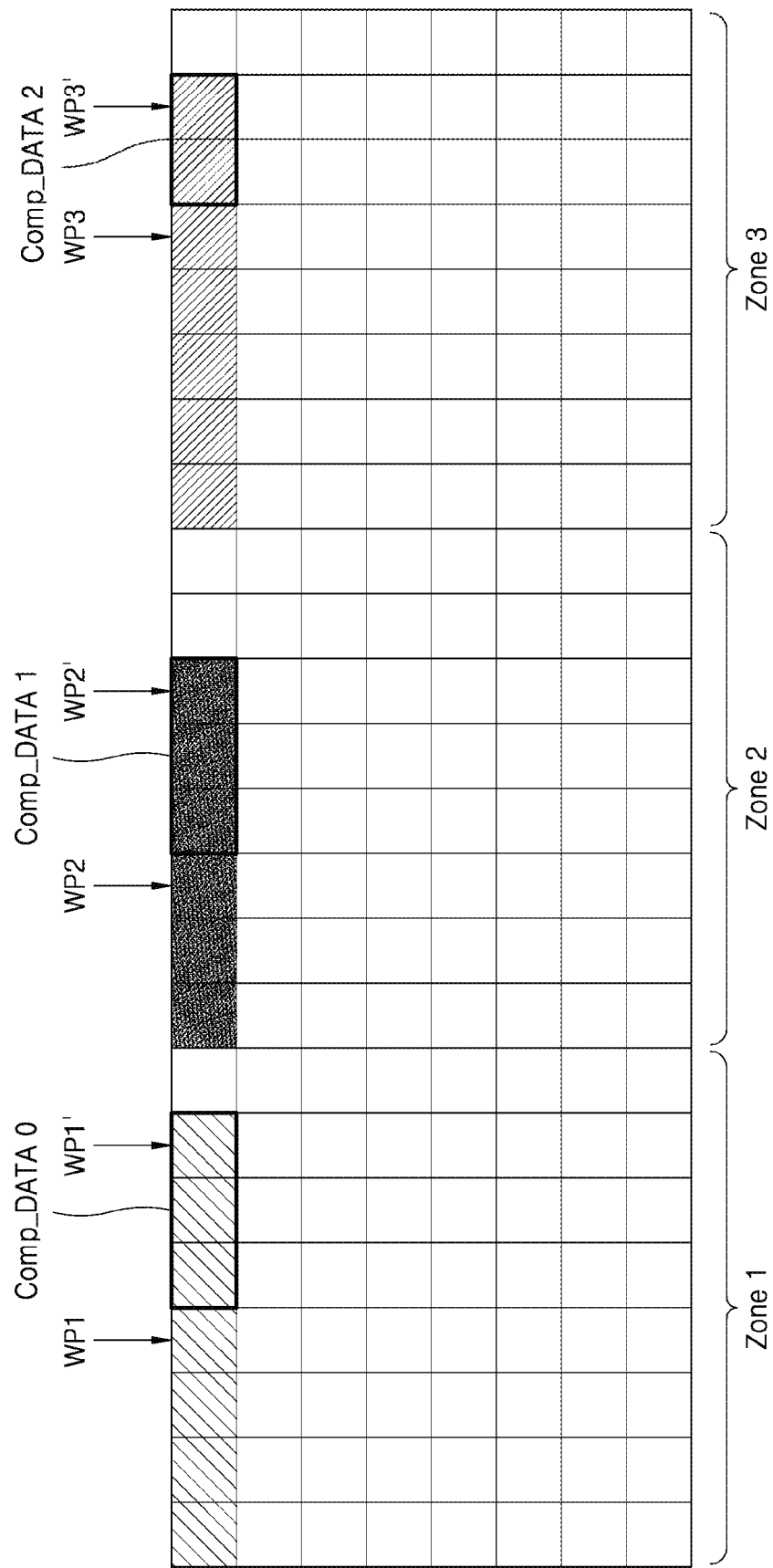
FIG. 8 is a conceptual diagram illustrating an operation of updating a write pointer, according to at least one example embodiment.

FIG. 8 is a conceptual diagram illustrating an operation of updating a write pointer, according to at least one example embodiment. In detail, FIG. 8 is a diagram illustrating an operation of updating a write pointer by using the zone management circuitry 310 of FIGS. 1 and 2.

Referring to FIGS. 4 to 8, when writing of pieces of compression data Comp_DATA 0, Comp_DATA 1, and Comp_DATA 2 is completed, the zone management circuitry 310 may update a plurality of write pointers, e.g., WP1, WP2, and WP3, etc., of a plurality of zones. For example, the zone management circuitry 310 may update the write pointer WP1 to a new write pointer WP1' so as to indicate a last storage location, at which the compression data Comp_DATA 0 is written, of a first zone Zone 1. Also, the zone management circuitry 310 may update the write pointer WP2 to a new write pointer WP2' so as to indicate a last storage location, at which the compression data Comp_DATA 1 is written, of a second zone Zone 2. Also, the zone management circuitry 310 may update the write pointer WP3 to a new write pointer WP3' so as to indicate a last storage location, at which the compression data Comp_DATA 2 is written, of a third zone Zone 3.

Figure 9:
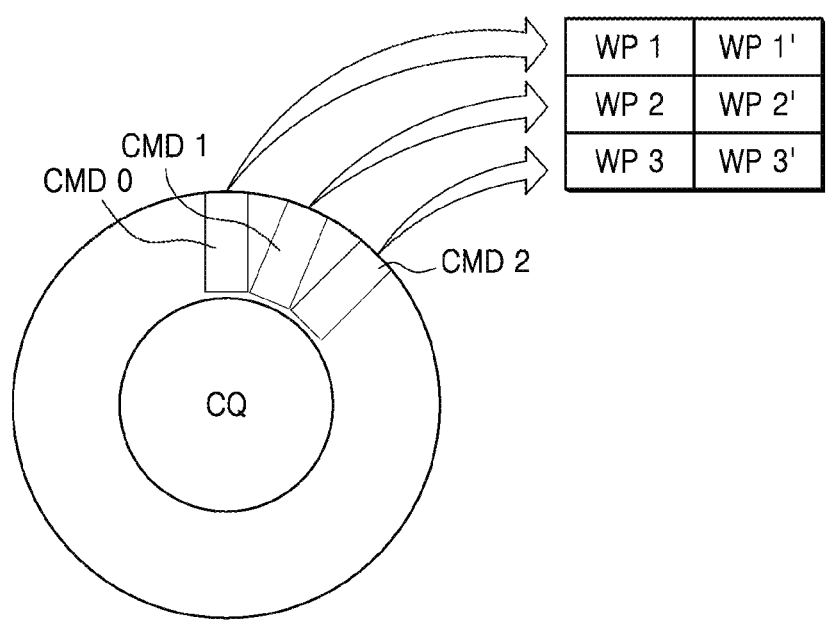
FIG. 9 is a conceptual diagram illustrating an operation of transferring compression information according to at least one example embodiment.

FIG. 9 is a conceptual diagram illustrating an operation of transferring compression information, according to at least one example embodiment. In detail, FIG. 9 is a diagram illustrating an operation of transferring compression information through a completion queue CQ of the zone management circuitry 310 of FIGS. 1 and 2. When the zone management circuitry 310 completes a write operation according to a request of the host 100, the zone management circuitry 310 may notify a completion queue CQ of the host 100 of command completion. Here, a completion queue CQ may store a processing result of an operation corresponding to a command of the host 100.

Referring to FIGS. 4 to 9, based on a plurality of commands CMD 0, CMD 1, and CMD 2 received from the host 100, the zone management circuitry 310 according to at least one example embodiment may write pieces of compression data Comp_DATA 0, Comp_DATA 1, and Comp_DATA 2 in the NVM 400 and may store, as a processing result of a write operation, compression information in the completion queue CQ of the host 100. Here, the compression information may denote information associated with a magnitude of each of the pieces of compression data Comp_DATA 0, Comp_DATA 1, and Comp_DATA 2, etc. Also, the host 100 may manage a capacity of each of a plurality of zones (for example, first to third zones) Zone 1, Zone 2, and Zone 3, etc., on the basis of compression information.

In at least one example embodiment, information associated with a magnitude of compression data may include write pointers WP1, WP2, and WP3 and updated write pointers WP1', WP2', and WP3' of a plurality of zones before the pieces of compression data Comp_DATA 0, Comp_DATA 1, and Comp_DATA 2 are written. That is, the zone management circuitry 310 may store, as a processing result of a write operation based on the commands CMD 0, CMD 1, and CMD 2, before-write write pointers, e.g., WP1, WP2, and WP3, etc., and updated write pointers, e.g., WP1', WP2', and WP3', etc., in the completion queue CQ of the host 100. Also, the host 100 may calculate magnitudes of the pieces of compression data Comp_DATA 0, Comp_DATA 1, and Comp_DATA 2 by using differences between the before-write write pointers WP1, WP2, and WP3 and the updated write pointers WP1', WP2', and WP3' stored in the completion queue CQ, and may manage capacities of the plurality of zones Zone 1, Zone 2, and Zone 3 on the basis of the calculated magnitudes.

For example, referring to FIG. 9, the zone management circuitry 310 may store, as a processing result of a write operation based on the command CMD 0, the write pointers WP1 and WP1' of the first zone Zone 1 in the completion queue CQ of the host 100. Also, the zone management circuitry 310 may store, as a processing result of a write operation based on the command CMD 1, the write pointers WP2 and WP2' of the second zone Zone 2 in the completion queue CQ of the host 100. The zone management circuitry 310 may store, as a processing result of a write operation based on the command CMD 2, the write pointers WP3 and WP3' of the third zone Zone 3 in the completion queue CQ of the host 100.

In a modifiable embodiment, the zone management circuitry 310 may store the magnitudes of the pieces of compression data Comp_DATA 0, Comp_DATA 1, and Comp_DATA 2 in the completion queue CQ of the host 100. That is, the zone management circuitry 310 may calculate the magnitudes of the pieces of compression data Comp_DATA 0, Comp_DATA 1, and Comp_DATA 2 by using the differences (e.g., memory location differences) between the before-write write pointers WP1, WP2, and WP3 and the updated write pointers WP1', WP2', and WP3', and may store the calculated magnitudes in the completion queue CQ. Also, the host 100 may manage the capacities of the plurality of zones Zone 1, Zone 2, and Zone 3 on the basis of the magnitudes stored in the completion queue CQ.

Figure 10:
FIG. 10 is a diagram illustrating a mapping table according to at least one example embodiment.

FIG. 10 is a diagram illustrating a mapping table MT according to at least one example embodiment.

Referring to FIG. 10, the mapping table MT according to at least one example embodiment may include the presence of compression and mapping information about mapping of a logical address LBA, a start physical address Start PPN, and a finish physical address Finish PPN.

The start physical address Start PPN and the finish physical address Finish PPN may denote a physical address, corresponding to a start location of an area of a memory storing data, and a physical address corresponding to a last location of the area of the memory. The mapping table MT may be stored in the NVM 400, and then, may be loaded into a buffer (not shown) or a working memory (not shown), such as DRAM, etc., by the controller 300. The presence of compression may represent whether data is compressed by the compression/decompression circuitry 320, or may represent raw data, which is not compressed.

The mapping table MT may differ based on a compression unit of the compression/decompression circuitry 320. In detail, in a case where the compression/decompression circuitry 320 compresses the data by block units, the mapping table MT may include mapping information for each block. Also, in a case where the compression/decompression circuitry 320 performs compression on the basis of a write command unit, the mapping table MT may include mapping information for each write command, etc.

When a read request is received from the host 100, the zone management circuitry 310 may identify a logical address LBA included in the read request, identify a start physical address Start PPN and a finish physical address Finish PPN each corresponding to the identified logical address LBA (and/or logical address range) with reference to the mapping table MT, and read data on the basis of the identified physical addresses. Also, the zone management circuitry 310 may identify a compression method of a zone corresponding to the read request by using the zone management table ZMT. Also, the zone management circuitry 310 may transfer the read data and information about the identified compression method to the compression/decompression circuitry 320 to request decompression.

Also, the compression/decompression circuitry 320 may decompress received data on the basis of the transferred information about the identified compression method according to a request of the zone management circuitry 310. For example, when read data, and information about a compression ratio of 75% (e.g., corresponding to the zone where the data was read from), are received from the zone management circuitry 310, the compression/decompression circuitry 320 may decompress the read data compressed at a compression ratio of 75% to have a before-compression magnitude (e.g., size).

When information indicating whether the data stored at the logical address LBA included in the read request is not compressed, e.g., described as N in the mapping table MT, the zone management circuitry 310 may directly transfer the read data to the host 100, but the example embodiments are not limited thereto.

Figure 11:
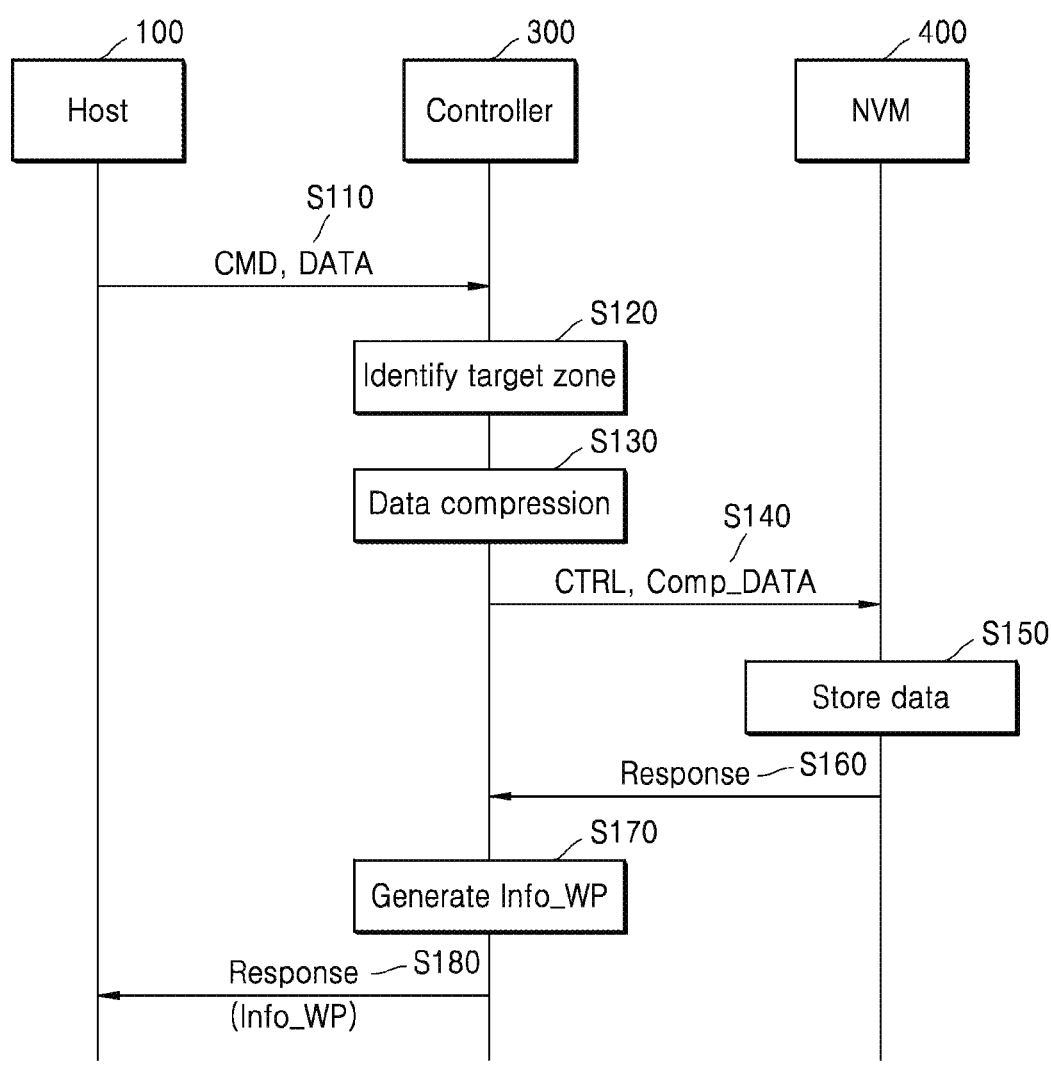
FIG. 11 is a flowchart illustrating a write operation performed between a host, a controller, and a non-volatile memory according to at least one example embodiment.

FIG. 11 is a flowchart illustrating a write operation performed between a host, a controller, and a non-volatile memory, according to at least one example embodiment. In detail, FIG. 11 is a flowchart illustrating an example of a write operation performed by the host 100, the controller 300, and the NVM 400 of FIG. 1.

Referring to FIGS. 1 and 11, in operation S110, the host 100 may transfer data DATA and a command CMD requesting a write operation to the controller 300. Also, in operation S120, the controller 300 may identify a target zone where the data DATA is to be written, based on a logical address included in the transferred command CMD. Also, in operation S130, the controller 300 may compress the data DATA according to a compression method corresponding to the target zone to generate compression data Comp_DATA, etc.

Also, in operation S140, the controller 300 may transfer, to the NVM 400, the compression data Comp_DATA and a control command CTRL for controlling the writing of the compression data Comp_DATA. In detail, the controller 300 may identify a write pointer representing a storage location, at which data is lastly written (e.g., was last written, was most recently written, etc.), of the target zone and may transfer, to the NVM 400, the control command CTRL for controlling writing of the compression data Comp_DATA at a next storage location of a write pointer, but the example embodiments are not limited thereto. Also, in operation S150, the NVM 400 may store the transferred compression data Comp_DATA at a next storage location of the target zone according to the control command CTRL. Also, when storing is completed, the NVM 400 may transfer a response signal Response, representing completion of storing, to the controller 300 in operation S160.

According to some example embodiments, when a real compression ratio of the compression data Comp_DATA is higher than a compression ratio corresponding to the target zone, the controller 300 may transfer the data DATA, received from the host 100, to the NVM 400. Also, the NVM 400 may store the transferred data DATA at a next storage location of the target zone, etc.

Also, when the response signal Response is received from the NMV 400, the controller 300 may generate information Info_WP about a write pointer in operation S170. In detail, the controller 300 may generate the information Info_WP about the write pointer which includes a write pointer of the target zone before the compression data Comp_DATA is written (e.g., an initial write pointer, etc.), and a write pointer of the target zone after the compression data Comp_DATA is written (e.g., an updated write pointer, etc.). Also, in operation S180, the controller 300 may transfer, to the host 100, the response signal Response corresponding to the command CMD along with the generated information Info_WP about the write pointer. In detail, the controller 300 may store the information Info_WP about the write pointer in the completion queue CQ of the host 100 and may transfer the response signal Response corresponding to the command CMD, etc.

Figure 12:
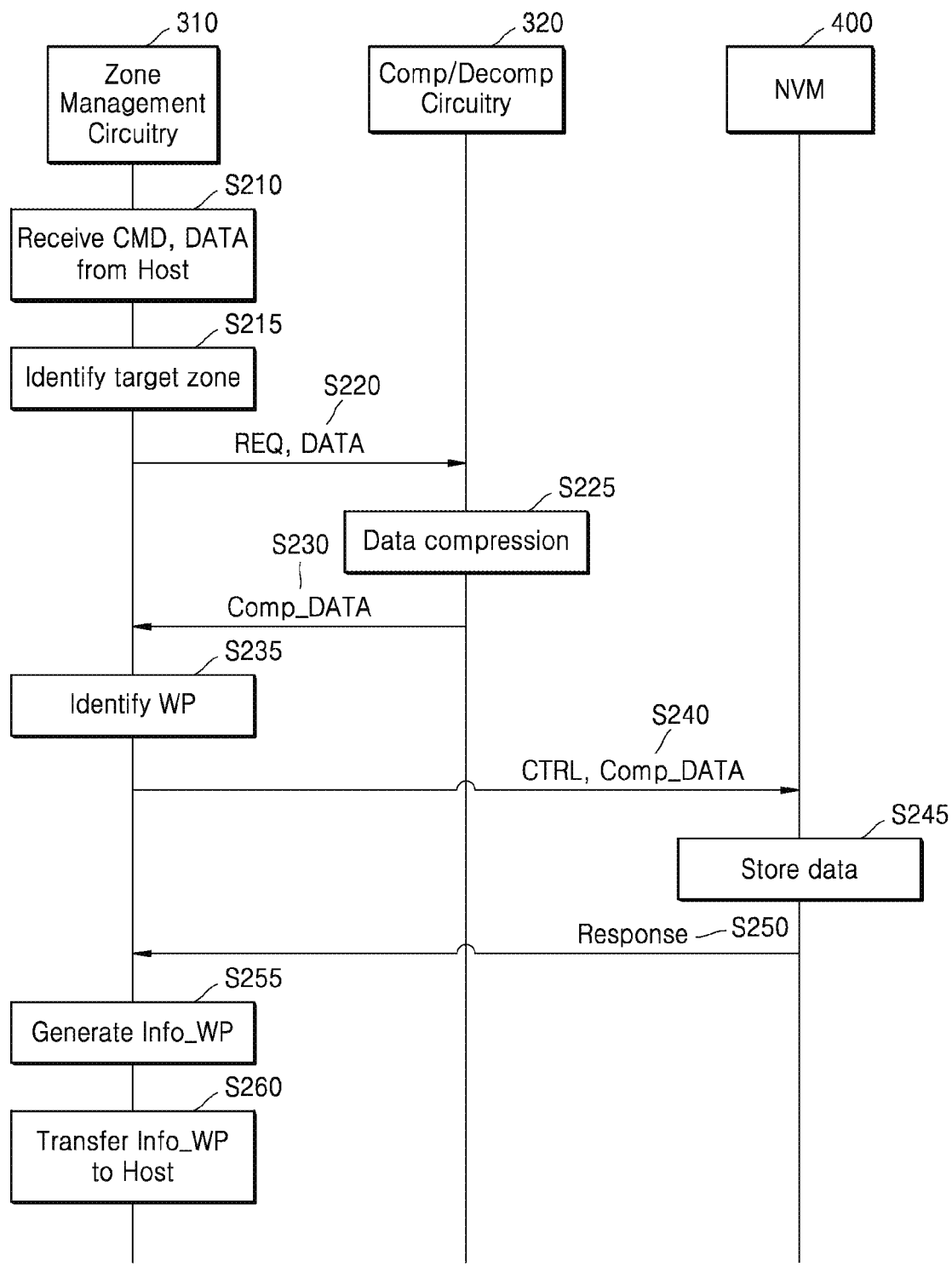
FIG. 12 is a flowchart illustrating a write operation performed between a zone management circuitry, a compression/decompression circuitry, and a non-volatile memory according to at least one example embodiment.

FIG. 12 is a flowchart illustrating a write operation performed between a zone management circuitry, a compression/decompression circuitry, and a non-volatile memory, according to at least one example embodiment. In detail, FIG. 12 is a flowchart illustrating an example of a write operation performed by the zone management circuitry 310, the compression/decompression circuitry 320, and the NVM 400 of FIG. 1.

Referring to FIGS. 1 and 12, in operation S210, the zone management circuitry 310 may receive data DATA and a command CMD, requesting a write operation, from the host 100. Also, in operation S215, the zone management circuitry 310 may identify a target zone where the data DATA is to be written, based on a logical address included in the received command CMD, etc.

Also, in operation S220, the zone management circuitry 310 may transfer, to the compression/decompression circuitry 320, the data DATA and a request signal REQ requesting compression of the data DATA on the basis of a compression method corresponding to the target zone. For example, the zone management circuitry 310 may identify the compression method corresponding to the target zone with reference to the zone management table ZMT including information about a compression method of each of a plurality of zones 410-1 to 410-n. Also, the zone management circuitry 310 may transfer, to the compression/decompression circuitry 320, the data DATA and a compression request REQ requesting compression of the data DATA on the basis of the identified compression method, etc.

Also, in operation S225, the compression/decompression circuitry 320 may compress the data DATA on the basis of received information about the compression method according to the compression request REQ of the zone management circuitry 310. Also, in operation S230, the compression/decompression circuitry 320 may transfer the compression data Comp_DATA, generated through compression, to the zone management circuitry 310.

Also, in operation S235, the zone management circuitry 310 may identify a write pointer WP representing a storage location, at which data is lastly written, of the target zone. Also, in operation S240, the zone management circuitry 310 may transfer, to the NVM 400, the compression data Comp_DATA and a control signal CTRL (e.g., instruction, command, etc.) for allowing the compression data Comp_DATA to be written at a next storage location of the identified write pointer WP.

Also, in operation S245, the NVM 400 may store the transferred compression data Comp_DATA at a next storage location of the target zone according to the control command CTRL. Also, when storing is completed, the NVM 400 may transfer a response signal Response, representing completion of storing, to the zone management circuitry 310 in operation S250.

According to some example embodiments, when a real compression ratio of the compression data Comp_DATA is higher than a compression ratio corresponding to the target zone, the zone management circuitry 310 may transfer the data DATA, received from the host 100, to the NVM 400. Also, the NVM 400 may store the transferred data DATA at a next storage location of the target zone.

Also, when the response signal Response is received from the NMV 400, the zone management circuitry 310 may generate information Info_WP about a write pointer in operation S255. For example, the zone management circuitry 310 may generate the information Info_WP about the write pointer which includes a write pointer of the target zone before the compression data Comp_DATA is written (e.g., initial write pointer, etc.), and a write pointer of the target zone after the compression data Comp_DATA is written (e.g., updated write pointer, etc.). Also, in operation S260, the zone management circuitry 310 may transfer, to the host 100, the generated information Info_WP about the write pointer(s) (e.g., information regarding and/or based on the initial write pointer and the updated write pointer, etc.).

Figure 13:
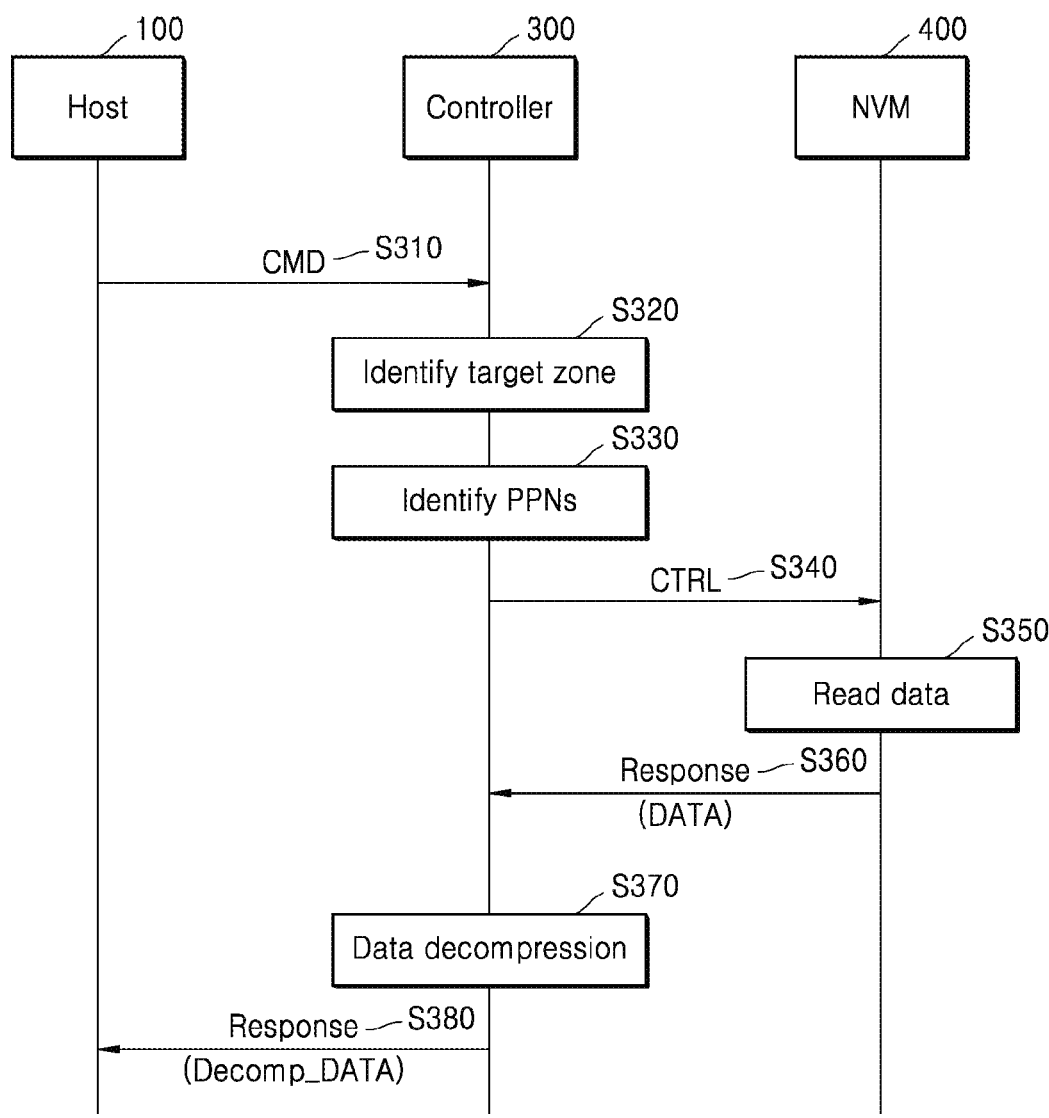
FIG. 13 is a flowchart illustrating a read operation performed between a host, a controller, and a non-volatile memory according to at least one example embodiment.

FIG. 13 is a flowchart illustrating a read operation performed between a host, a controller, and a non-volatile memory, according to at least one example embodiment. In detail, FIG. 13 is a flowchart illustrating an example of a read operation performed by the host 100, the controller 300, and the NVM 400 of FIG. 1.

Referring to FIGS. 1 and 13, in operation S310, the host 100 may transfer a command CMD, requesting a read operation, to the controller 300, etc. Also, in operation S320, the controller 300 may identify a target zone from which data is to be read, based on a logical address included in the transferred command CMD. Also, the controller 300 may identify physical addresses corresponding to the logical address and/or target data size in operation S330. In detail, the controller 300 may identify a start physical address Start PPN and a finish physical address Finish PPN each corresponding to the logical address (and/or logical address range) by using the mapping table MT, but is not limited thereto.

Also, in operation S340, the controller 300 may transfer a control command CTRL, controlling a read operation, to the NVM 400. For example, the controller 300 may transfer the control command CTRL, controlling the read operation, to the NVM 400 on the basis of a start physical address Start PPN and a finish physical address Finish PPN, each representing a location at which data for requesting read is stored, but the example embodiments are not limited thereto, and for example, the controller 300 may transfer the start physical address Start PPN and data length/data size information to the NVM 400, etc. Also, in operation S350, the NVM 400 may read data from a target zone according to the control command CTRL. Also, in operation S360, the NVM 400 may transfer a response signal Response, representing read completion, to the controller 300 along with read data DATA.

Also, in operation S370, the controller 300 may decompress the read data DATA. For example, the controller 300 may identify a compression method corresponding to the target zone and may decompress the read data DATA by using a decompression method corresponding to the identified compression method corresponding to the target zone. Also, in operation S380, the controller 300 may transfer a response signal Response, representing read completion, to the host 100 along with decompression data Decomp_DATA.

According to some example embodiments, the controller 300 may identify whether the read data DATA is compressed or not, and when the read data DATA is not compressed, the controller 300 may immediately transfer the read data DATA to the host 100, but the example embodiments are not limited thereto.

Figure 14:
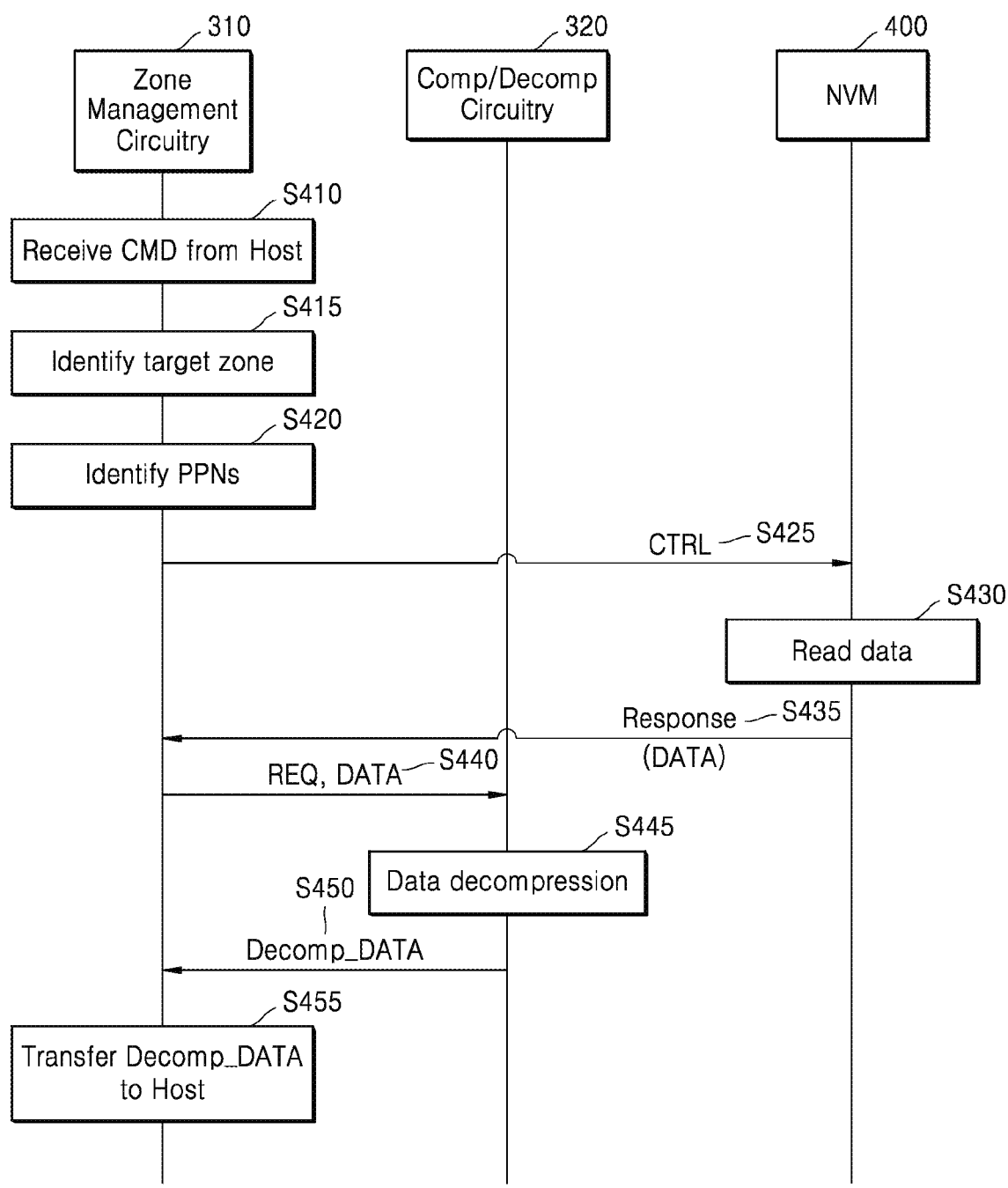
FIG. 14 is a flowchart illustrating a read operation performed between a zone management circuitry, a compression/decompression circuitry, and a non-volatile memory according to at least one example embodiment.

FIG. 14 is a flowchart illustrating a read operation performed between a zone management circuitry, a compression/decompression circuitry, and a non-volatile memory, according to at least one example embodiment. In detail, FIG. 14 is a flowchart illustrating an example of a read operation performed by the zone management circuitry 310, the compression/decompression circuitry 320, and the NVM 400 of FIG. 1.

Referring to FIGS. 1 and 14, in operation S410, the zone management circuitry 310 may receive a command CMD, requesting a read operation, from the host 100. Also, in operation S415, the zone management circuitry 310 may identify a target zone from which data is to be read, based on a logical address (and/or logical address range, data size information, etc.) included in the received command CMD. Also, the zone management circuitry 310 may identify physical addresses corresponding to the logical address in operation S420. In detail, the zone management circuitry 310 may identify a start physical address Start PPN and a finish physical address Finish PPN each corresponding to the logical address (and/or logical address range, etc.) by using the mapping table MT.

Also, in operation S425, the zone management circuitry 310 may transfer a control command CTRL, controlling a read operation, to the NVM 400. In detail, the zone management circuitry 310 may transfer the control command CTRL, controlling the read operation, to the NVM 400 on the basis of a start physical address Start PPN and a finish physical address Finish PPN, each representing a location at which data for requesting read is stored, etc. Also, in operation S430, the NVM 400 may read data from a target zone according to the control command CTRL. Also, in operation S435, the NVM 400 may transfer a response signal Response, representing read completion, to the controller 300 along with read data DATA, etc.

Also, in operation S440, the zone management circuitry 310 may transfer a decompression request REQ, requesting decompression, to the compression/decompression circuitry 320 along with the read data DATA. For example, the zone management circuitry 310 may identify the compression method corresponding to the target zone with reference to the zone management table ZMT. Also, the zone management circuitry 310 may transfer a decompression request REQ, requesting decompression of the read data DATA, to the compression/decompression circuitry 320 along with the read data DATA, and information about the compression method of the target zone, etc.

Also, in operation S445, the compression/decompression circuitry 320 may compress the read data DATA on the basis of received information about the compression method according to the decompression request REQ of the zone management circuitry 310. Also, in operation S450, the compression/decompression circuitry 320 may transfer the decompressed data Decomp_DATA, generated through decompression, to the zone management circuitry 310. Also, in operation S455, the zone management circuitry 310 may transfer the decompressed data Decomp_DATA to the host 100, but the example embodiments are not limited thereto.

According to some example embodiments, the zone management circuitry 310 may identify whether the read data DATA is compressed or not, and when the read data DATA is not compressed, the zone management circuitry 310 may directly transfer the read data DATA to the host 100 without passing through the compression/decompression circuitry 320, but the example embodiments are not limited thereto.

Figure 15:
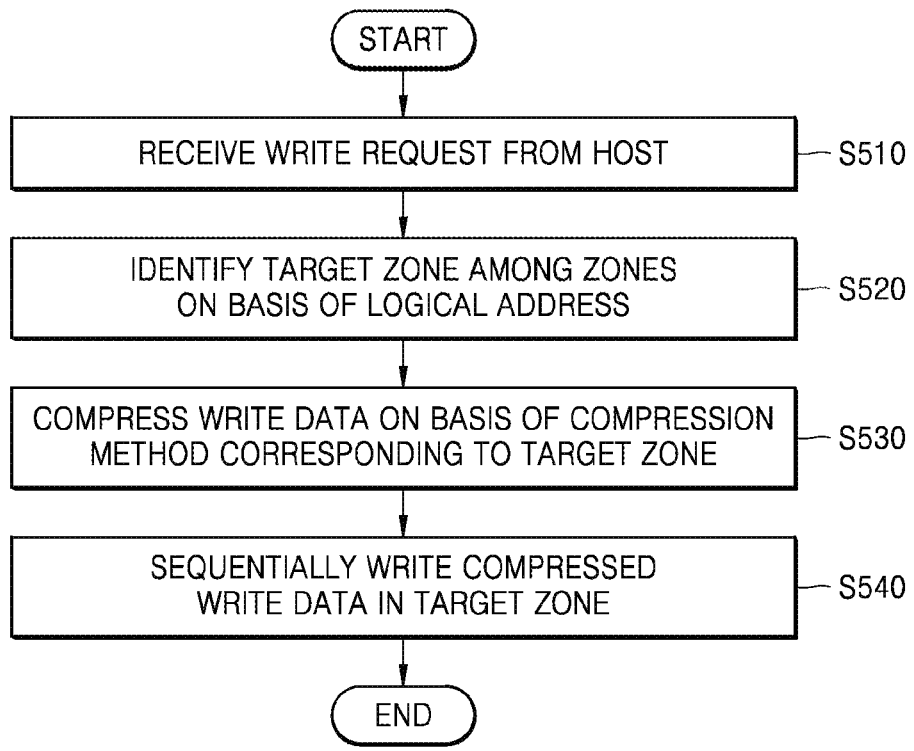
FIG. 15 is a flowchart illustrating an operating method of a storage device according to at least one example embodiment.

FIG. 15 is a flowchart illustrating an operating method of a storage device according to at least one example embodiment. In detail, FIG. 15 is a flowchart illustrating an example of a write operation of the storage device 200 of FIG. 1. At least a portion of a write operation of a storage device according to at least one example embodiment may be performed by the controller 300 of FIG. 1.

Referring to FIGS. 1 and 15, first, the storage device 200 may receive a write request from a host in operation S510. The storage space of the NVM 400 may be set to a plurality of zones on the basis of an attribute of write data (e.g., based on and/or corresponding to the compression attribute of the write data, etc.), and the write request may include a logical address of (e.g., associated with, corresponding to, etc.) a target zone among the plurality of zones. Also, in operation S520, the storage device 200 may identify the target zone among the plurality of zones on the basis of the logical address (e.g., the storage device 200 determines the target zone of a write request based on the logical address by determining which zone the logical address is included within, etc.). Also, in operation S530, the storage device 200 may compress write data on the basis of a compression method corresponding to the target zone. Also, in operation S540, the storage device 200 may sequentially write the compressed write data in the target zone. In detail, the storage device 200 may write the compressed write data sequentially from a storage location next to a storage location, at which data is lastly written (e.g., most recently written, etc.), in the target zone. When a real compression ratio of the compressed write data is higher than a compression ratio corresponding to the target zone, the storage device 200 may write the received write data (e.g., uncompressed write data and/or the original write data, etc.) in the target zone, but the example embodiments are not limited thereto.

As described above, the storage system 200 according to at least one example embodiment may individually set the degree of compression on the basis of an attribute of data written in each of a plurality of zones, and thus, may appropriately adjust the tradeoff between data input/output latency and the space efficiency of a storage device.

Figure 16:
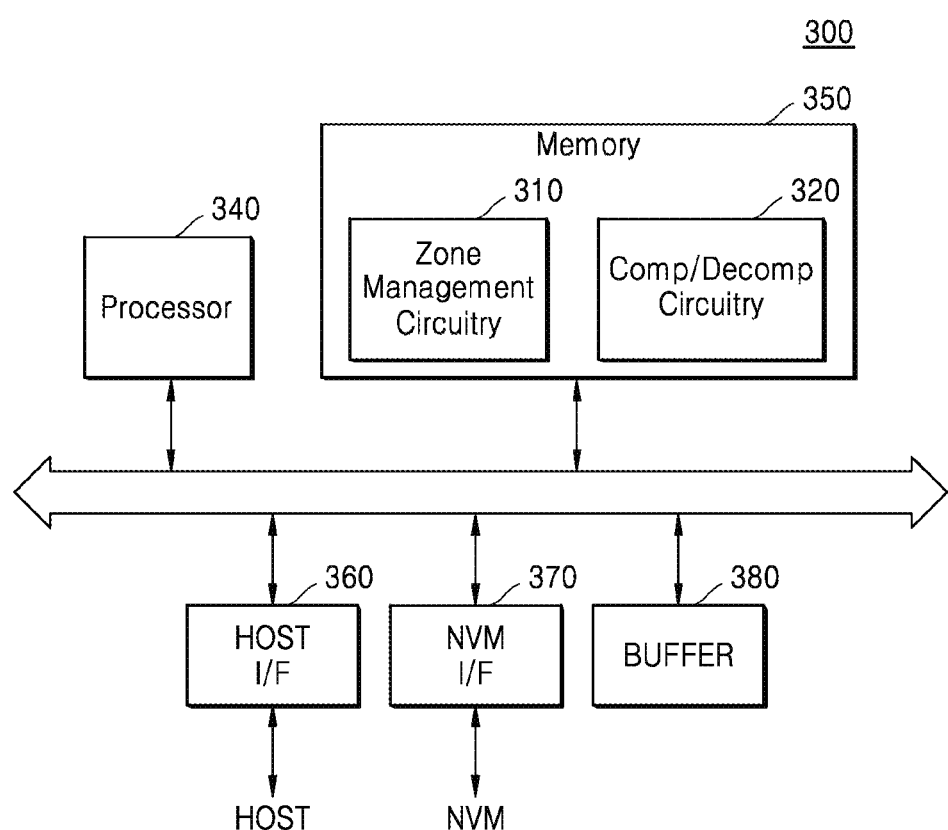
FIG. 16 is a block diagram illustrating a configuration of a controller according at least one example embodiment.

FIG. 16 is a block diagram illustrating a configuration of a controller 300 according to at least one example embodiment. In detail, FIG. 16 is a block diagram illustrating a configuration of the controller 300 of FIG. 1.

Referring to FIG. 16, the controller 300 may include at least one processor 340 (e.g., processing circuitry, etc.), a memory 350, a host interface 360, an NVM interface 370, and/or a buffer 380, and the elements may communicate with one another through at least one bus, but the example embodiments are not limited thereto, and for example, the controller 300 may include a greater or lesser number of constituent components.

The processor 340 may include a central processing unit (CPU) or a microprocessor and may control an overall operation of the controller 300. In at least one example embodiment, the processor 340 may be processing circuitry which may include hardware such as logic circuits; a hardware/software combination such as at least one processor core executing software and/or executing any instruction set; or a combination thereof. For example, the processor 340 more specifically may include, but is not limited to, at least one multi-core processor (e.g., a dual-core processor, a quad-core processor, etc.), a field programmable gate array (FPGA), a programmable logic unit, an application-specific integrated circuit (ASIC), a system-on-chip (SOC), an intellectual property (IP) block, etc. In at least one example embodiment, the processor 340 may control an overall operation associated with a host command received from a host HOST.

The memory 350 may operate based on control by the processor 340 and may be used as a working memory, a buffer memory, a cache memory, or the like. For example, the memory 350 may be implemented as a volatile memory, such as DRAM or static random access memory (SRAM), or an NVM such as phase change random access memory (PRAM) or flash memory, etc.

According to at least one example embodiment, the discussed functionality of the zone management circuitry 310 and/or the compression/decompression circuitry 320 may be implemented as firmware and/or software (e.g., computer readable instructions, etc.), and may be loaded into the memory 350, for execution by the processor 340 and/or for execution by separate processing circuits, etc. For example, the functionality of the zone management circuitry 310 and/or the compression/decompression circuitry 320 may be implemented in a flash translation layer (FTL) and may be loaded into the memory 350. However, the example embodiments are not limited thereto, and the zone management circuitry 310 and/or the compression/decompression circuitry 320 may be implemented as hardware. Operations described above with reference to FIGS. 1 to 15 may be performed by the processor 340 by using the zone management circuitry 310 and/or the compression/decompression circuitry 320.

The host interface 360 may provide an interface between the host HOST and the controller 300, and for example, may provide an interface based on universal serial bus (USB), multimedia card (MMC), PCI express (PIC-E), advanced technology attachment (ATA), serial AT attachment (SATA), parallel AT attachment (PATA), small computer system interface (SCSI), serial attached SCSI (SAS), enhanced small disk interface (ESDI), integrated drive electronics (IDE), or the like. The NVM interface 370 may provide an interface between the controller 300 and an NVM.

The buffer 380 may temporarily store write data received from the host HOST. The zone management circuitry 310 may identify a compression ratio of compression data received from the compression/decompression circuitry 320 and may determine whether the identified compression ratio is higher than a compression ratio corresponding to a zone where the compression data is to be stored. For example, when the identified compression ratio is higher than the compression ratio, the zone management circuitry 310 may read raw data, corresponding to the compression data, from the buffer 380 and may write the read raw data in a corresponding zone, but the example embodiments are not limited thereto.

Figure 17:
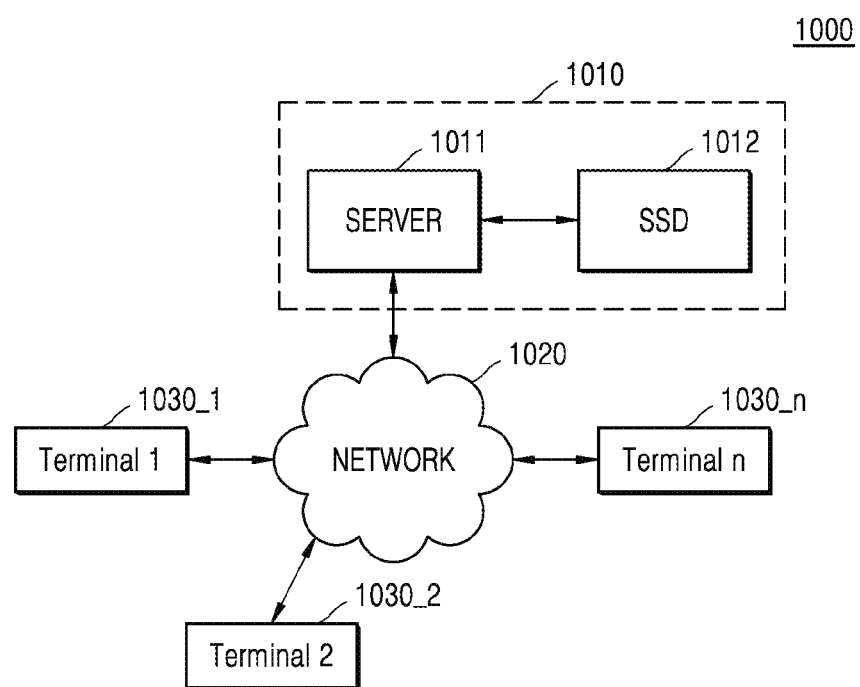
FIG. 17 is a block diagram illustrating a network system including a server system according to at least one example embodiment.

FIG. 17 is a block diagram illustrating a network system 1000 including a server system according to at least one example embodiment. The network system 1000 may include at least one server system 1010 and/or a plurality of terminals 1030_1 to 1030_n communicating with the server system 1010 over at least one network 1020, but the example embodiments are not limited thereto. The server system 1010 may include a server 1011 and a solid state drive (SSD) 1012, etc. In this case, the SSD 1012 may correspond to the storage device 200 according to at least one example embodiment described above. In some example embodiments, the SSD 1012 may be implemented by using at least one example embodiment described above with reference to FIGS. 1 to 16. —While various example embodiments of the inventive concepts have been particularly shown and described with reference to example embodiments thereof, it will be understood that various changes in form and details may be made therein without departing from the spirit and scope of the following claims.

What is claimed is:

1. A storage device comprising:
    a non-volatile memory including a plurality of zones, the non-volatile memory configured to sequentially store data in at least one of the plurality of zones, the plurality of zones including at least a first zone and a second zone, the first zone and the second zone having a first compression ratio and a second compression ratio, respectively, the first compression ratio and the second compression ratio being different; and
    a controller configured to,
        receive a first write command and first data from a host, the first write command including a first logical address,
        identify the first zone of the plurality of zones based on the first logical address,
        compress the first data based on the first compression ratio,
        write the compressed first data sequentially to the first zone,
        identify an initial write pointer representing a last storage location of the first zone,
        write the compressed first data sequentially to a next storage location from the last storage location of the first zone based on the identified write pointer,
        update the initial write pointer in response to the writing of the compressed first data, and
        transfer, to the host, information regarding the initial write pointer and information regarding the updated write pointer.

2. The storage device of claim 1, wherein the controller is configured to:
    sequentially write the compressed first data; and
    transfer, to the host, information about a magnitude of the compressed first data in response to sequentially writing the compressed first data.

3. The storage device of claim 1, further comprising:
    a buffer configured to store a mapping table, the mapping table including mapping information about mapping of at least one logical address, a start physical address and a finish physical address to a corresponding storage location of the non-volatile memory at which data is written; and
    wherein the controller is configured to,
        sequentially write the compressed first data to the non-volatile memory based on the mapping information corresponding to the first logical address, and
        update the mapping table to include a first start physical address and a first finish physical address of a corresponding storage location at which the compressed first data is written.

4. The storage device of claim 3, wherein the controller is configured to:
    receive a read command from the host;
    read second data corresponding to a second logical address from the non-volatile memory based on the mapping table;
    decompress the read second data based on mapping table information corresponding to the second logical address; and
    transfer the decompressed second data to the host.

5. The storage device of claim 4, wherein the controller is configured to:
    identify the second zone corresponding to the second logical address among the plurality of zones; and
    decompress the read second data based on decompression settings corresponding to the identified second zone included in the mapping table.

6. The storage device of claim 1, wherein the controller is configured to compress the first data using a write command unit or a block unit.

7. A storage system comprising:
    a host;
    a storage device including a non-volatile memory and controller, the non-volatile memory including a plurality of zones and configured to sequentially store data, and the controller configured to control the non-volatile memory, the plurality of zones including at least a first zone and a second zone, the first zone and the second zone having a first compression ratio and a second compression ratio, respectively, the first compression ratio and the second compression ratio being different;

the host is configured to transfer write data and a write command including a logical address to the storage device; and the storage device is configured to,
- identify the first zone of the plurality of zones based on the logical address in response to the write command from the host,
- compress the write data based on the first compression ratio,
- identify an initial write pointer representing a last storage location of the first zone,
- write the compressed write data sequentially to a next storage location from the last storage location of the first zone based on the identified initial write pointer,
- update the initial write pointer in response to the writing of the compressed write data, and
- transfer, to the host, information regarding the initial write pointer and information regarding the updated write pointer.

8. The storage system of claim 7, wherein
the host is configured to transfer, to the storage device, a management command for setting the plurality of zones and a plurality of compression ratios corresponding to each of the plurality of zones; and
the storage device is configured to set the plurality of zones, and the corresponding compression ratios associated with each of the plurality of zones on the non-volatile memory, based on the management command received from the host.

9. The storage system of claim 8, wherein the host is configured to generate the management command for setting the plurality of zones based on a number of predicted write accesses which are to be written on the storage device.

10. The storage system of claim 9, wherein the host is configured to:
- determine the number of predicted write accesses of the write data;
- select the first zone from among the plurality of zones based on the determined number of predicted write accesses; and
- generate a write command including a logical address of the first zone.

11. The storage system of claim 7, wherein the host is configured to:
- manage a capacity of the first zone based on the information about the initial write pointer and the information about the updated write pointer.

12. An operating method of a storage device including a non-volatile memory including a plurality of zones sequentially storing data, the plurality of zones including at least a first zone and a second zone, the first zone and the second zone having a first compression ratio and a second compression ratio, respectively, the first compression ratio and the second compression ratio being different, the operating method comprising:
- receiving, using processing circuitry, a first write command and first data from a host;
- identifying, using the processing circuitry, the first zone of the plurality of zones based on a first logical address included in the first write command;
- compressing, using the processing circuitry, the first data based on the first compression ratio;
- identifying, using the processing circuitry, an initial write pointer representing a last storage location of the first zone;
- writing, using the processing circuitry, the compressed first data sequentially to a next storage location from the last storage location of the first zone based on the identified initial write pointer;
- updating, using the processing circuitry, the initial write pointer in response to the writing of the compressed first data; and
- transferring, using the processing circuitry, information regarding the initial write pointer and information regarding the updated write pointer to the host.

13. The operating method of claim 12, further comprising:
- storing, using the processing circuitry, mapping information including information related to a mapping of the first logical address to a first start physical address and a first finish physical address of a storage location at which the compressed first data is written.

14. The operating method of claim 13, further comprising:
- receiving, using the processing circuitry, a read command from the host, the read command including a second logical address;
- reading, using the processing circuitry, data corresponding to a second logical address from the non-volatile memory based on the second logical address and mapping information corresponding to the second logical address;
- identifying, using the processing circuitry, a zone corresponding to the second logical address among the plurality of zones;
- decompressing, using the processing circuitry, the read data according to decompression settings corresponding to the identified zone; and
- transferring, using the processing circuitry, the decompressed data to the host.

* * * * *